US010068557B1

(12) United States Patent
Engel et al.

(10) Patent No.: US 10,068,557 B1
(45) Date of Patent: Sep. 4, 2018

(54) GENERATING MUSIC WITH DEEP NEURAL NETWORKS

(71) Applicant: Google Inc., Mountain View, CA (US)

(72) Inventors: Jesse Engel, Oakland, CA (US); Mohammad Norouzi, Sunnyvale, CA (US); Karen Simonyan, London (GB); Adam Roberts, Oakland, CA (US); Cinjon Resnick, New York, NY (US); Sander Etienne Lea Dieleman, London (GB); Douglas Eck, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/684,537

(22) Filed: Aug. 23, 2017

(51) Int. Cl.
*G10H 1/00* (2006.01)
*G06N 3/08* (2006.01)
*G06N 3/04* (2006.01)
*G10H 7/12* (2006.01)

(52) U.S. Cl.
CPC .............. *G10H 1/0041* (2013.01); *G06N 3/04* (2013.01); *G06N 3/08* (2013.01); *G10H 1/0025* (2013.01); *G10H 7/12* (2013.01); *G10H 2210/111* (2013.01); *G10H 2250/311* (2013.01)

(58) Field of Classification Search
CPC .............. G10H 1/0041; G10H 2210/11; G10H 2250/311; G06N 3/04; G06N 3/08
USPC .......................................................... 84/607
See application file for complete search history.

(56) References Cited

U.S. PATENT DOCUMENTS

| | | | | |
|---|---|---|---|---|
| 6,297,439 | B1 * | 10/2001 | Browne | G10H 1/0025 84/635 |
| 9,141,906 | B2 * | 9/2015 | Chen | G06N 3/08 |
| 9,147,154 | B2 * | 9/2015 | Wang | G06N 3/02 |
| 9,514,404 | B1 * | 12/2016 | Corrado | G06N 3/0454 |
| 9,736,603 | B2 * | 8/2017 | Osborne | G06F 17/30743 |
| 9,747,544 | B2 * | 8/2017 | Wan | G06N 3/0436 |

(Continued)

OTHER PUBLICATIONS

Agiomyrgiannakis, "Vocaine the Vocoder and Applications is Speech Synthesis", International Conference on Acoustics, Speech and Signal Processing, Apr. 19-24, 2015, South Brisbane, Queensland, Australia, 5 pages.

(Continued)

*Primary Examiner* — David Warren
(74) *Attorney, Agent, or Firm* — Dority & Manning, P.A.

(57) ABSTRACT

The present disclosure provides systems and methods that include or otherwise leverage a machine-learned neural synthesizer model. Unlike a traditional synthesizer which generates audio from hand-designed components like oscillators and wavetables, the neural synthesizer model can use deep neural networks to generate sounds at the level of individual samples. Learning directly from data, the neural synthesizer model can provide intuitive control over timbre and dynamics and enable exploration of new sounds that would be difficult or impossible to produce with a hand-tuned synthesizer. As one example, the neural synthesizer model can be a neural synthesis autoencoder that includes an encoder model that learns embeddings descriptive of musical characteristics and an autoregressive decoder model that is conditioned on the embedding to autoregressively generate musical waveforms that have the musical characteristics one audio sample at a time.

20 Claims, 15 Drawing Sheets
(9 of 15 Drawing Sheet(s) Filed in Color)

(56) References Cited

U.S. PATENT DOCUMENTS

| | | | |
|---|---|---|---|
| 9,858,263 B2* | 1/2018 | Xiao | G06F 17/2785 |
| 9,961,028 B2* | 5/2018 | Ramsey | H04L 51/08 |
| 2014/0058735 A1* | 2/2014 | Sharp | G10L 25/63 |
| | | | 704/500 |

OTHER PUBLICATIONS

Bertin-Mahieux et al., "The Million Song Dataset", 12th International Society of Music Information Retrieval Conference, Oct. 24-28, 2011, Miami, Florida, pp. 591-596.

Bishop, "Mixture Density Networks", Technical Report NCRG/94/004, Neural Computing Research Group, Aston University, 1994, 26 pages.

Bishop, "Pattern Recognition and Machine Learning", Information and Science and Statistics, Springer-Verlag, New York, Inc., Secaucus, NJ, 2006, 758 pages.

Boashash, "Estimating and Interpreting the Instantaneous Frequency of a Signal i. Fundamentals", Proceedings of the Institute of Electrical and Electronics Engineers, vol. 80, No. 4, 1992, pp. 520-538.

Brown, "Calculation of a constant Q Spectral Transform", The Journal of the Acoustical Society of America, vol. 89, No. 1, 1991, pp. 425-434.

Chen et al., "Semantic Image Segmentation with Deep Convolutional Nets and Fully Connected CRFs", arXiv:1412.7062v4, International Conference on Learning Representations, 2015, San Diego, California, 14 pages.

Chen et al., "Variational Lossy Autoencoder", arXiv:1611.02731v1, Nov. 8, 2016, 13 pages.

Chiba et al., "The Vowel: Its Nature and Structure", Tokyo-Kaiseikan, 1942, 4 pages.

Chowning, "The Synthesis of Complex Audio Spectra by Means of Frequency Modulation", Journal of the Audio Engineering Society, vol. 21, No. 7, 1973, pp. 526-534.

Deng et al., "ImageNet: A Large-Scale Hierarchical Image Database", In Computer Vision and Pattern Recognition, Jun. 20-25, 2009, Miami, Florida, 8 pages.

Dudley, "Remaking Speech", The Journal of the Acoustical Society of America, vol. 11, No. 2, 1939, pp. 169-177.

Dutilleux, "An Implementation of the "Algorithme à Trous" to Compute the Wavelet Transform", Wavelets: Time-Frequency Methods and Phase Space, Springer Berlin Heidelberg, 1989, pp. 298-304.

Fan et al., "TTS Synthesis with Bidirectional LSTM Based Recurrent Neural Networks", In Fifteenth Annual Conference of the International Speech Communication Association, 2014, Beijing, China, pp. 1964-1968.

Fant, "Acoustic Theory of Speech Production", Mouton & Co., The Hague, 1970, 5 pages.

Garofolo et al., "DARPA TIMIT Acoustic-Phonetic Continuous Speech Corpus CD-ROM", National Institute of Standards and Technology Speech Disc 1-1.1., National Aeronautics and Space Administration STI/Recon Technical Report, 1993, 84 pages.

Gonzalvo et al., "Recent Advances m Google Real-Time HHM-Driven Unit Selection Synthesizer", In Interspeech, Sep. 8-12, 2010, San Francisco, California, pp. 2238-2242.

Goodfellow et al., "Generative Adversarial Nets", In Advances in Neural Information Processing Systems, 2014, Montreal, Quebec, 9 pages.

Goto et al., "Rwc Music Database: Music Genre Database and Musical Instrument Sound Database", Proceedings of the 4th International Conference on Music Information Retrieval, Oct. 2003, pp. 229-230.

Griffin et al., "Signal Estimation from Modified Short-Time Fourier Tranform", Institute of Electrical and Electronics Engineers Transactions on Acoustics, Speech, and Signal Processing, vol. 32, No. 2, Apr. 1984, pp. 236-243.

Gulrajani et al. "A Latent Variable Model for Natural Images", arXiv:1611.05013v1, Nov. 15, 2016, 9 pages.

He et al., "Deep Residual Learning for Image Recognition", In Proceedings of the Institute of Electrical and Electronics Engineers Conference on Computer Vision and Pattern Recognition, Jun. 27-30, 2016, Seattle, Washington, pp. 770-778.

Hochreiter et al., "Long Short-Term Memory", Neural Comput, vol. 9, No. 8, 1997, Lugano, Switzerland, pp. 1735-1780.

Holschneider et al., "A Real-Time Algorithm for Signal Analysis with the Help of the Wavelet Transfor", Wavelets: A Time-Frequency Methods and Phase Space,1989, Springer Berlin Heidelberg, pp. 286-297.

Hoshen et al., "Speech Acoustic Modeling from Raw Multi-Channel Waveforms", In Acoustics, Speech and Signal Processing, Institute of Electrical and Electronics Engineers International Conference on Acoustics, Speech, and Signal Processing, Apr. 19-24, 2015, South Brisbane, Queensland, Australia, 5 pages.

Humphrey, "A Collection of Musical Sound Datasets", 2016, https;//github.com/ejhumphrey/minst-dataset/, retrieved on Sep. 20, 2017, 5 pages.

Hunt et al., "Unit Selection in a Concatenative Speech Synthesis System Using a Large Speech Database", In Acoustics, Speech, and Signal Processing, Institute of Electrical and Etectronics Engineers International Conference on, vol. 1, Jun. 1996, pp. 373-376.

Imai et al., "Unbiased Estimation of Log Spectrum", European Signal Processing Conference, Grenoble, France, Sep. 5-8, 1988, pp. 203-206.

Ioffe et al., "Batch Normalization: Accelerating Deep Network Training by Reducing Internal Covariate Shift", 2015, http://arxiv.org/abs/1502.03167, retrieved on Aug. 22, 2017, 11 pages.

Itakura, "Line Spectrum Representation of Linear Predictor Coefficients of Speech Signals", The Journal of the Acoustical Society of America, vol. 57, No. S1, 1975, pp. S35-S35.

ITU-T, "Pulse Code Modulation (PCM) of Voice Frequencies", Recommendation G. 711, 1988, 12 pages.

Jozefowics et al., "Exploring the Limits of Language Modeling", http://arxiv.org/abs/1602.02410, retrieved on Aug. 22, 2017, 11 pages.

Juang et al., "Mixture Autoregressive Hidden Markov Models for Speech Signals", Institute of Electrical and Electronics Engineers Transactions of Acoustics, Speech, and Signal Processing, vol. 33, No. 6, Dec. 1985, pp. 1404-4413.

Karaali et al., "Text-To-Speech Conversion with Neural Networks: A Recurrent TDNN Approach", In Eurospeeeh, 1997, 4 pages.

Kawahara et al., "Aperiodicity Extraction and Control Using Mixed Mode Excitation and Group Delay Manipulation for a High Quality Speech Analysis", Modification, and Synthesis System Straight, in Second International Workshop on Models and Analysis of Vocal Emissions for Biomedical Applications, Sep. 13-15, 2001, Florence, Italy, 6 pages.

Kawahara et al., "Restructuring Speech Representations Using a Pitch-Adaptive Time-Frequency Smoothing and an Instantaneous-Frequency-Based F0 Extraction: Possible Role of a Repetitive Structure in Sounds", vol. 27, Issues 3-4, Apr. 1999, pp. 187-207.

King et al., "The Blizzard Challenge", University of Edinburgh, 2008, Old College, South Bridge, Edinburgh, 18 pages.

Kingma, et al., "A Method for Stochastic Optimization", CoRR, abs/1412.6980v9, 2014, 15 pages.

Kingma et al., "Auto-Encoding Variational Bayes", arXiv preprint arXiv:1312.6114v10, 2013, 14 pages.

Krizhevsky et al., "Learning Multiple Layers of Features from Tiny Images", Apr. 8, 2009, Toronto, Canada, 60 pages.

Law et al., "Input-Agreement: A New Mechanism for Collecting Data Using Human Computation Games", In Proceedings of the SIGCHI Conference on Human Factors in Computing Systems, Association for Computing Machinery, Apr. 4-9, 2009, Boston, Massachusetts, pp. 1197-1206.

LeCun et al., "The MNIST Database of Handwritten Digits", 1998, http://yann.lecun.com/exdb/mnist/, retrieved on Sep. 20, 2017, 8 pages.

Maia et al., "Statistical Parametric Speech Synthesis with Joint Estimation of Acoustic and Excitation Model Parameters", Interna-

(56) References Cited

OTHER PUBLICATIONS tional Speech Conununication Association Speech Synthesis Workshop, 2010, Cambridge, United Kingdom, pp. 88-93.
McDermott et al., "Sound Texture Synthesis via Filter Statistics", 2009 Institute of Electrical and Electronics Engineers Workshop on Applications of Signal Processing to Audio and Acoustics, Oct. 18-21, 2009, New Paltz, New York, 4 pages.
Mehri et al., "An Unconditional End-To-End Neural Audio Generation Model", CoRR, abs/1612.07837v2, 2016, 11 pages.
Morise et al., "World: A Vocoder-Based High-Quality Speech Synthesis System for Real-Time Applications", Institute of Electronics, Information and Communication Engineers Transactions on Information and Systems, vol. 99, No. 7, 2016, pp. 1877-1884.
Moulines et al., "Pitch Synchronous Waveform Processing Techniques for Text-To-Speech Synthesis Using Diphones", Speech Communication, vol. 9, Issues 5-6, Dec. 1990, Amsterdam, The Netherlands, pp. 453-467.
Muthukumar et al., "A Deep Learning Approach to Data-Driven Parameterizations for Statistical Parametric Speech Synthesis", airXiv:1409.8558,2014, 5 pages.
Nair et al., "Rectified Linear Units Improve Restricted Boltzmann Machines", International Conference on Machine Learning 2010, Proceedings of the 27th International Conference, Jun. 21-24, 2010, Haifa, Israel, 8 pages.
Nakamura et al., "Integration of Spectral Feature Extraction and Modeling for HMM-Based Speech Synthesis", The Institute of Electronics, Information, and Communication Engineers, Transactions on Information and Systems, vol. 97, No. 6, Jun. 2014, pp. 1438-1448.
Netzer et al., "Reading Digits in Natural Images with Unsupervised Feature Learning", Neural Information Processing Systems, Workshop on Deep Learning and Unsupervised Feature Learning, vol. 2011, 2011, 9 pages.
Palm et al., "Estimating Phoneme Class Conditional Probabilities from Raw Speech Signal Using Convolutional Neural Networks", In Interspeech, Aug. 25-29, 2013, Lyon, France, pp. 1766-1770.
Peltonen et al., "Nonlinear Filter Design: Methodologies and Challenges", In Image and Signal Processing and Analysis, Proceedings of the 2nd International Symposium on, 2001, Tampere, Finland, pp. 102-107.
Pinch et al., "Analog Days: The Invention and Impact of the Moog Synthesizer", Harvard University Press, 2009, 4 pages.
Poritz, "Linear Predictive Hidden Markov Models and the Speech Signal", In Acoustics, Speech, and Signal Processing, May 3-5, 1982, Paris, France, pp. 1291-1294.
Punk, "Giorgio by Moroder", URL: https://www.youtube.com/watch?v=zhl-Csl-sG4, 2014, retrieved on Sep. 20, 2017, 21 pages.
Rabiner et al., "Fundamentals of Speech Recognition", Prentice-Hall International, Incorporation, A Simon & Schuster Company, 1993, Englewood Cliffs, New Jersey, 277 pages.
Raffel, "Learning-Based Methods for Comparing Sequences with Applications to Audio-to-MIDI Alignment and Matching", PhD Thesis, Columbia University, 2016, New York, New York, 222 pages.
Romani et al., "A Real-Time System for Measuring Sound Goodness in Instrumental Sounds", In Audio Engineering Society Convention 138, Audio Engineering Society, May 7-10, 2015, Warsaw, Poland, 6 pages.
Sagisaka et al., "ATRv-Talk Speech Synthesis System", International Conference on Spoke a Language Processing, Oct. 12-16, 1992, Alberta, Canada, pp. 483-486.
Sainath et al., "Learning the Speech Front-End with Raw Waveform", Interspeech, Sep. 6-10, 2015, Dresden, Germany, 5 pages.
Salimans et al., "Improved Techniques for Training Gans", CoRR, abs/1606.03498v1, 2016, 10 pages.
Saroff et al., "Musical Audio Synthesis Using Autoencoding Neural Nets", International Computer Music Association, Sep. 14-20, 2014, Athens, Greece, pp. 1411-1417.
Takaki et al., "A Deep Auto-Encoder Based Low-Dimensional Feature Extraction from FFT Spectral Envelopes for Statistical Parametric Speech Synthesis", 2016 Institute of Electrical and Electronics Engineers International Conference on Acoustics, Speech and Signal Processing, Mar. 20-25, 2016, Shanghai, China, pp. 5535-5539.
Takamichi et al., "Postfilters to Modify the Modulation Spectrum for Statistical Parametric Speech Synthesis", Institute of Electrical and Electronics Engineers/Association for Computing Machinery Transactions on Audio, Speech, and Language Processing, Nov. 2016, Piscataway, New Jersey, 13 pages.
Theis et al., "A Note on the Evaluation of Generative Models", arXiv preprint arXiv:1511.01844v3, 2015, 10 pages.
Theis et al., "Generative Image Modeling Using Spatial LSTMS", Advances in Neural Information Processing Systems, Dec. 7-15, 2015, Montreal, Canada, 9 pages.
Thickstun et al., "Learning Features of Music from Scratch", In preprint https://arxiv.org/abs/1611.09827v2, 2016, 14 pages.
Toda et al., "A Speech Parameter Generation Algorithm Considering Global Variance for HMM-Based Speech Synthesis", Institute of Electronic, Information and Communication Engineers Transactions on Information and Systems, vol. 90, No. 5, Aug. 27-31, 2007, Antwerp, Belgium, pp. 816-824.
Toth et al., "Statistical Approach to Vocal Tract Transfer Function Estimation Based on Factor Analyzed Trajectoty HMM", In Acoustics, Speech, and Signal Processing, Mar. 31-Apr. 4, 2008, Las Vegas, Nevada, pp. 3925-3928.
Tokuda et al., "Directly Modeling Speech Waveforms by Neural Networks for Statistical Parametric Speech Synthesis", Institute of Electrical and Electronics Engineers International Conference on Acoustics, Speech, and Signal Processing, Apr. 19-24, 2015, Queensland, Australia, 5 pages.
Tokuda et al., "Directly Modeling Voiced and Unvoiced Components in Speech Waveforms by Neural Networks", Institute of Electrical and Electronics Engineers , in Acoustics, Speech and Signal Processing, Mar. 20-25, 2016, Shanghai, China, 5 pages.
Tokuda et al., "Speech Synthesis as a Statistical Machine Learning Problem", Invited Talk Given at Addison-Rutland Supervisory Union, Dec. 14, 2011, Fair Haven, Vermont, 66 pages.
Tuerk et al., "Speech Synthesis Using Artificial Neural Networks Trained on Cepstral Coefficients", In EUROSPEECH, Sep. 22-25, 1993, Berlin, Germany, 4 pages.
Tuske et al., "Acoustic Modeling with Deep Neural Networks Using Raw Time Signal for LVCSR", In Interspeech, Sep. 14-18, 2014, Singapore, pp. 890-894.
Uria et al., "Modelling Acoustic Feature Dependencies with Artificial Neural Networks", Institute of Electrical and Electronics Engineers, in Acoustics, Speech, and Signal Processing, Apr. 19-24, 2015, Queensland, Australia, 5 pages.
Van Den Oord et al., "Conditional Image Generation with PixelCNN Decoders", arXiv preprint arXiv:1606.05328v2, 2016, 13 pages.
Van Den Oord et al., "Pixel Recurrent Neural Networks", arXiv:1601.06759v3, 2016, 11 pages.
Van Den Oord et al., "WaveNet: A Generative Model for Raw Audio", Sep. 12, 2016, London, United Kingdom, 15 pages.
Vincent et al., "Stacked Denoising Autoencoders: Learning Useful Representations in a Deep Network with a Local Denoising Criterion", Journal of Machine Learning, Research, vol. 11, Mar. 1, 2010, pp. 3371-3408.
White, "Sampling Generative Networks: Notes on a Few Effective Techniques", CoRR, abs/1609.04468v3, 2016, 11 pages.
Wu et al., "Minimum Generation Error Training with Direct Log Spectral Distortion on LSPs for HMM-Based Speech Synthesis", In Interspeech, Sep. 22-26, 2008, Brisbane, Australia, pp. 577-580.
Xenakis, "Formalized Music", Pendragon Press, 1971, Stuyvesant, New York, 201 pages.
Yamagishi, "English Multi-Speaker Corpus for CSTR Voice Cloning Toolkit", 2012, http://homepages.inf.ed.ac.uk/jyamagis/page3/page58/page58.html, retrieved on Aug. 22, 2017, 1 page.
Yoshimura, "Simultaneous Modeling of Phonetic and Prosodic Parameters, and Characteristic conversion for HMM-Based Text-To-Speech Systems", PhD Thesis, Nagoya Institute of Technology, Jan. 2002, Nagoya, Japan, 109 pages.

(56) References Cited

OTHER PUBLICATIONS

Yu et al., "Multi-Scale Content Aggregation by Dilated Convolutions", arXiv preprint arXiv:1511.07122, 2015, 13 pages.
Zen, "An Example of context-Dependent Label Format for HMM-Based Speech Synthesis in English", in ICLR, Mar. 2, 2016, Cambridge, United Kingdom, 1 page.
Zen et al., "Fast, Compact, and High Quality LSTM-RNN Based Statistical Parametric Speech Synthesize for Mobile Devices", In Interspeech, Sep. 8-12, 2016, San Francisco, California, 5 pages.
Zen et al., "Reformulating the HMM as a Trajectory Model by Imposing Explicit Relationships Between Static and Dynamic Features", Computer Speech Language, vol. 21, No. 1, Jan. 11, 2006, Nagoya, Japan, pp. 153-173.
Zen et al., "Statistical Parametric Speech Synthesis", Speech Communication, vol. 51, No. 1, Apr. 6, 2009, 24 pages.
Zen et al., "Statistical Parametric Speech Synthesis Using Deep Neural Networks", Institute of Electrical and Electronics Engineers, In Acoustics, Speech, and Signal Processing, May 26-31, 2013, Vancouver, BC, Canada, pp. 2962-7966.
Bickerman et al., "Learning to Create Jazz Melodies Using Deep Belief Nets", Proceedings of the International Conference on Computational Creativity, Lisbon, Portugal, Jan. 7-9, 2010, pp. 228-237.
DeepLearning, "Modeling and Generating Sequences of Polyphonic Music with the RNN-RBM", http://deeplearning.net/tutorial/rnnrbm.html, retrieved on Nov. 20, 2017, 7 pages.
Eck, "Composing Music with LSTM—Blues Improvisation", http://www.iro.umontreal.ca/~eckdoug/blues/index.html, retrieved on Nov. 20, 2017, 2 pages.
Eck et al., "Finding Temporal Structure in Music: Blues Improvisation with LSTM Recurrent Networks", Proceedings of the 2002 Insitute of Electrical and Electronics Engineers Neural Networks for Signal Processing, New York, New York, Sep. 6, 2002, 11 pages.
GitHub, Inc, "Tensorflow/ Magenta", https://github.com/tensorflow/magenta/tree/master/magenta/models, retrieved on Nov. 20, 2017, 2 pages.
International Business Machines, "AlchemyLanguage", https://www.ibm.com/watson/developercloud/alchemy-language.html , retrieved on Nov. 20, 2017, 5 pages.
International Business Machines, "IBM Watson Music", https://www.ibm.com/watson/music/, retrieved on Nov. 20, 2017, 6 pages.
Johnson, "Composing Music with Recurrent Neural Networks", Aug. 2, 2015, http://www.hexahedria.com/2015/08/03/composing-music-with-recurrent-neural-networks/, retrieved on Nov. 20, 2017, 10 pages.
Karpathy, "The Unreasonable Effectiveness of Recurrent Neural Networks", May 21, 2015, http://karpathy.github.io/2015/05/21/rnn-effectiveness/, retrieved on Nov. 20, 2017, 28 pages.
Kim, "Using Keras & Theano for Deep Learning Driven Jazz Generation", https://deepjazz.io/, retrieved on Nov. 20, 2017, 2 pages.
McDonald, "Neural Nets for Generating Music", Aug. 25, 2017, https://medium.com/artists-and-machine-intelligence/neural-nets-for-generating-music-f46dffac21c0, retrieved on Nov. 20, 2017, 18 pages.
Mehri et al., "SampleRNN: An Unconditional End-To-End Neural Audio Generation Model", arXiv:1612.07837v2, Feb. 11, 2017, 11 pages.
Nay, "Training Watson to Be Your Musical Muse", Jun. 7, 2016, https://www.ibm.com/blogs/think/2016/06/training-watson-to-be-your-musical-muse/, retrieved on Nov. 20, 2017, 12 pages.
Simon, "Performance RNN: Generating Music with Expressive Timing and Dynamics", https://magenta.tensorflow.org/performance-rnn, retrieved on Nov. 20, 2017, 6 pages.
Sony CSL, "Flow Machines", http://www.flow-machines.com/, retrieved on Nov. 20, 2017, 5 pages.
Todd, "A Connectionist Approach to Algorithmic Composition", Computer Music Journal, vol. 13, No. 4, The Massachusetts Institute of Technology, Cambridge, Massachusetts, pp. 27-43.
Walder, "Algorithmic Composition: Beyond the Piano Roll", Jun. 2016, http://users.cecs.anu.edu.au/~christian.walder/, retrieved on Nov. 20, 2017, 2 pages.
Wang et al., "Tacotron: Towards End-To-End Speech Synthesis", arXiv:1703.10135v2, Apr. 6, 2017, 10 pages.
Whitman, "A Singular Christmas (2004)", https://notes.variogr.am/2009/11/30/a-singular-christmas-2004/ retrieved on Nov. 20, 2017, 7 pages.

* cited by examiner

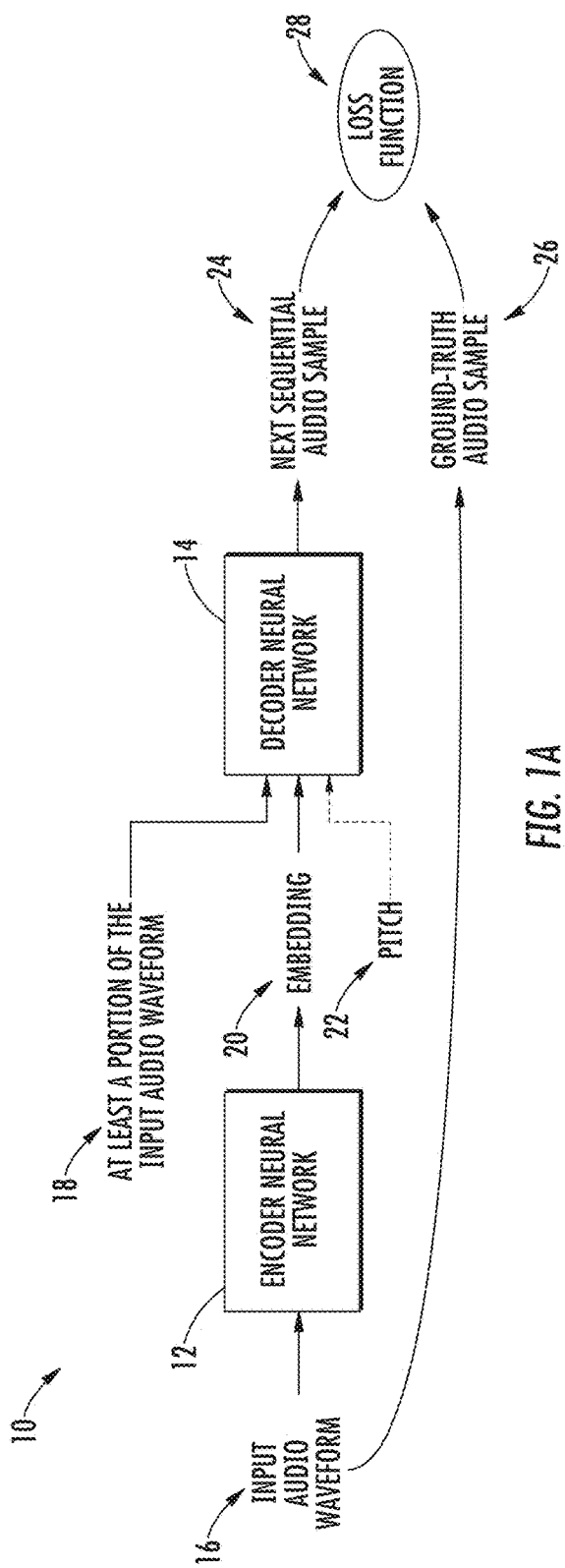
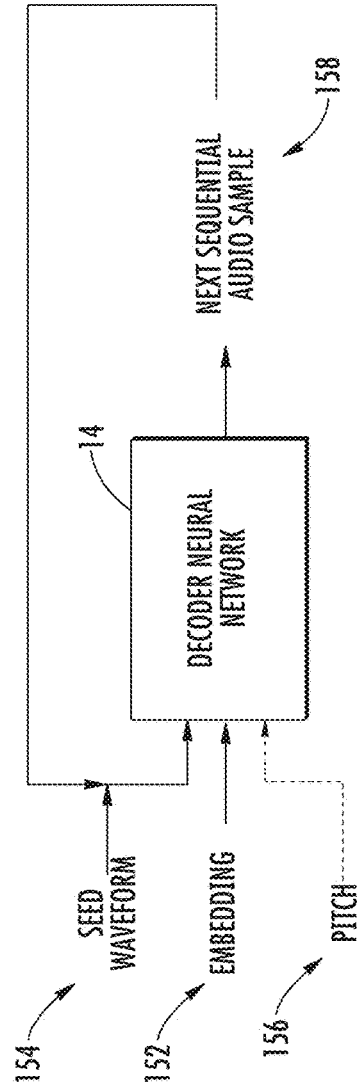
FIG. 1A
FIG. 1B

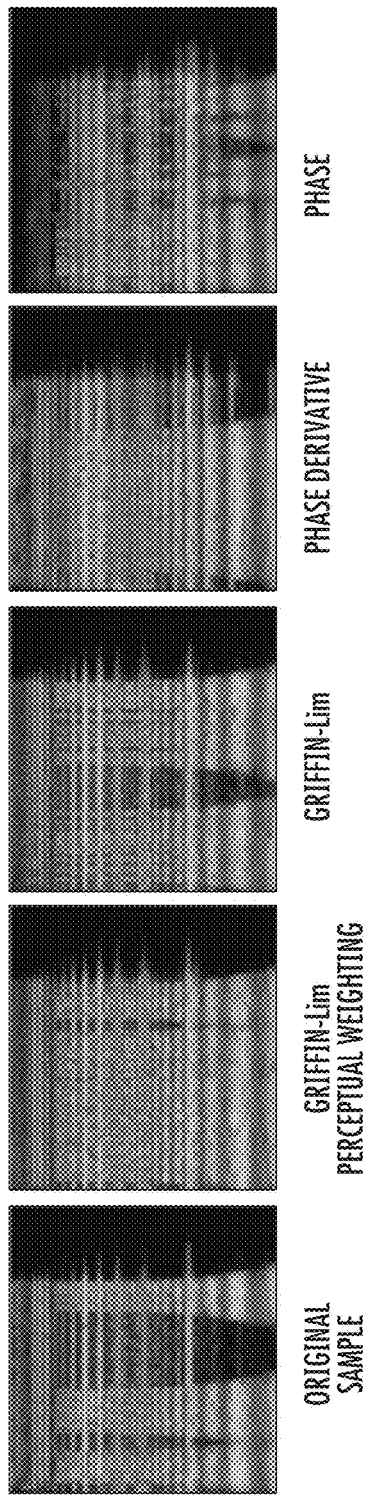
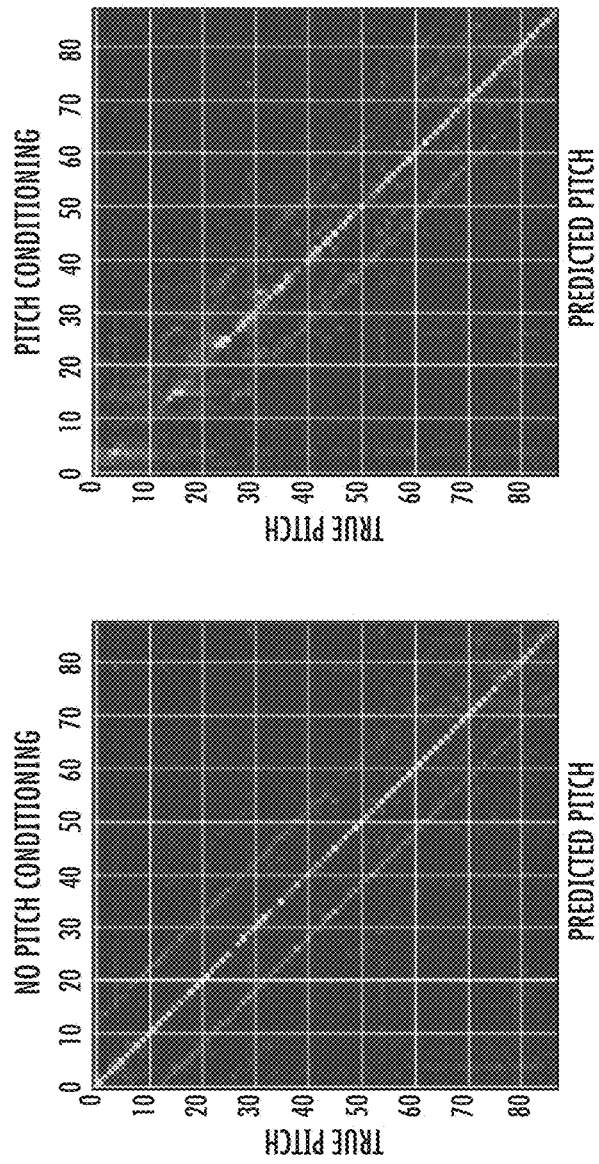
FIG. 8
FIG. 9

GENERATING MUSIC WITH DEEP NEURAL NETWORKS

FIELD

The present disclosure relates generally to machine learning. More particularly, the present disclosure relates to musical audio synthesis using machine-learned models such as neural networks.

BACKGROUND

Audio synthesis is important for a large range of applications including text-to-speech (TTS) systems and music generation. Certain existing audio generation algorithms, known as vocoders in TTS and synthesizers in music, respond to higher-level control signals to create fine-grained audio waveforms. Synthesizers have a long history of being hand-designed instruments, accepting control signals such as 'pitch', 'velocity', and filter parameters to shape the tone, timbre, and dynamics of a sound. In spite of their limitations, or perhaps because of them, synthesizers have had a profound effect on the course of music and culture in the past half century.

SUMMARY

Aspects and advantages of embodiments of the present disclosure will be set forth in part in the following description, or can be learned from the description, or can be learned through practice of the embodiments.

One aspect of the present disclosure is directed to a computer system to generate music. The computer system includes a machine-learned neural synthesizer model that includes an autoencoder model. The autoencoder model includes an encoder neural network and a decoder neural network. The encoder neural network is configured to receive an input audio waveform and, in response, provide an embedding descriptive of the input audio waveform, The decoder neural network is configured to receive the embedding and at least a portion of the input audio waveform and, in response, predict a next sequential audio sample for the input audio waveform. The computer system includes one or more processors and one or more non-transitory computer readable media that collectively store instructions that, when executed by the one or more processors cause the computer system to perform operations. The operations include evaluating a loss function that compares the next sequential audio sample predicted by the decoder neural network to a ground-truth audio sample associated with the input audio waveform. The operations include adjusting one or more parameters of the autoencoder model to improve the loss function.

Another aspect of the present disclosure is directed to a computer-implemented method to generate music. The method includes obtaining, by one or more computing devices, a first embedding descriptive of one or more desired audio characteristics. The method includes inputting, by the one or more computing devices, the first embedding into a decoder neural network configured to receive the first embedding and autoregressively generate a first audio waveform based at least in part on the first embedding. The decoder neural network has been jointly trained as part on an autoencoder model that further includes an encoder neural network configured to receive input audio waveforms and to provide embeddings descriptive of the input audio waveforms. The method includes receiving, by the one or more computing devices, the first audio waveform as an output of the decoder neural network.

Another aspect of the present disclosure is directed to one or more non-transitory computer-readable media that collectively store a generative neural network configured to receive embeddings and autoregressively generate audio waveforms based at least in part on the embeddings. The generative neural network has been jointly trained as part of an autoencoder model that further includes an embedding neural network configured to receive example audio waveforms and to provide embeddings descriptive of the example audio waveforms. The one or more non-transitory computer-readable media further collectively store instructions that, when executed by one or more processors, cause the one or more processors to perform operations. The operations include obtaining, by one or more computing devices, a first embedding descriptive of one or more desired audio characteristics. The operations include inputting, by the one or more computing devices, the first embedding into the generative neural network. The operations include receiving, by the one or more computing devices, the first audio waveform as an output of the generative neural network.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Detailed discussion of embodiments directed to one of ordinary skill in the art is set forth in the specification, which makes reference to the appended figures, in which:

FIG. 1A depicts an example neural synthesizer according to example embodiments of the present disclosure.

FIG. 1B depicts an example neural synthesizer according to example embodiments of the present disclosure.

FIG. 8 depicts example reconstructions from baseline models trained with different phase representations according to example embodiments of the present disclosure.

FIG. 9 depicts example confusion matrices for an example pitch classification model according to example embodiments of the present disclosure.

DETAILED DESCRIPTION

1. Overview

Figure 1C:
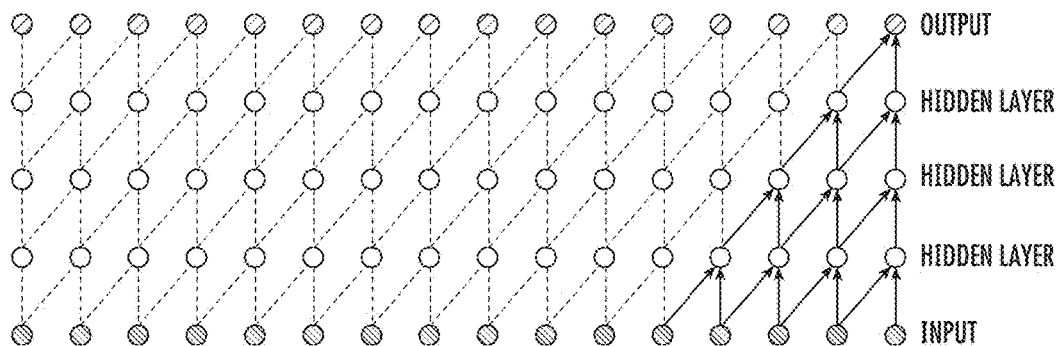
FIG. 1C depicts example causal convolutional layers according to example embodiments of the present disclosure.

Generally, the present disclosure is directed to a novel approach to music synthesis that leverages machine learning. In particular, systems and methods of the present disclosure can include or otherwise leverage a machine-learned neural synthesizer model. Unlike a traditional synthesizer which generates audio from hand-designed components like oscillators and wavetables, the neural synthesizer model can use deep neural networks to generate sounds at the level of individual samples. Learning directly from data, the neural synthesizer model can provide intuitive control over timbre and dynamics and enable exploration of new sounds that would be difficult or impossible to produce with a hand-tuned synthesizer.

Thus, the present disclosure provides a data-driven approach to audio synthesis. Rather than specifying a specific arrangement of oscillators or an algorithm for sample playback, such as in FM Synthesis or Granular Synthesis, the systems and methods of the present disclosure can generate new types of expressive and realistic instrument sounds with a neural synthesizer model that includes one or more neural networks. Further, the present disclosure demonstrates that this neural synthesizer can learn a semantically meaningful hidden representation that can be used as a high-level control signal for manipulating tone, timbre, and/or dynamics during playback.

According to one aspect of the present disclosure, in some implementations, the neural synthesizer can use or include a decoder neural network that has an autoregressive structure that is similar to the WaveNet model (see, van den Oord et al., WaveNet: A generative model for raw audio. CoRR, abs/1609.03499, 2016a), such that the decoder neural network can predict audio one audio sample at a time. Additionally, in some implementations, the neural synthesizer model can include or use an encoder neural network to learn representations of individual sounds, instruments, styles, or other musical characteristics so that they can be reproduced and interpolated in semantically meaningful way.

More particularly, in some implementations, the decoder neural network can be jointly trained with the encoder neural network in the style of an autoencoder. The encoder neural network can learn embeddings that meaningfully represent various musical characteristics such as, for example, the space of instrument sounds. In particular, the encoder neural network can learn temporal hidden codes to effectively capture longer term structure without external conditioning. The decoder neural network can be conditioned on the temporal embeddings learned by the encoder neural network from the raw audio waveform.

In some implementations, the neural synthesizer model can have hundreds of millions of parameters and can actually predict the movement of the audio waveform itself, as opposed to the values of several internal components such as oscillators. This allows for a very flexible range of sounds to be created and modeled through the use of deep neural networks.

According to another aspect, the present disclosure also provides a large-scale dataset for exploring neural audio synthesis of musical notes which can be referred to as the NSynth dataset. In particular, the NSynth dataset is a large-scale and high-quality dataset of musical notes that is an order of magnitude larger than comparable public datasets.

Using the NSynth dataset, the present disclosure demonstrates improved qualitative and quantitative performance of the neural synthesizer over a well-tuned spectral autoencoder baseline. In addition, the present disclosure shows that the neural synthesis model learns a manifold of embeddings that allows for morphing between instruments, meaningfully interpolating in timbre to create new types of sounds that are realistic and expressive.

Training on the NSynth dataset enables use of the outputs of the neural synthesis model in a musical way as they correspond to notes that can be played from a keyboard or other MIDI controller. Using a sample-level generative model of sound as a musical synthesizer is a novel application of machine learning, with many potential avenues of further research and development.

Thus, as one example technical effect and benefit provided by the present disclosure, musical audio waveforms can be synthesized by a machine-learned model. In particular, the musical audio waveforms can be autoregressively generated one audio sample at a time. Thus, the present disclosure provides novel techniques that enable the synthesis of music without the need for hand-tuning of components like oscillators and wavetables.

As another example technical effect and benefit, the neural synthesis model of the present disclosure can be used to create new sounds that were heretofore unobtainable using traditional synthesizers. In particular, the neural synthesis model can learn a manifold of embeddings. Interpolating two or more of such embeddings allows for morphing between instruments, meaningfully interpolating in timbre and creating new types of sounds.

As yet another example, technical effect and benefit, the neural synthesis model of the present disclosure can outperform baseline techniques for music generation. In particular, the neural synthesis model of the present disclosure can more accurately reconstruct audio waveforms for different notes and instruments relative to a baseline model provided by the present disclosure for purposes of comparison.

1.1 Introduction

WaveNet (van den Oord et al., WaveNet: A generative model for raw audio. CoRR, abs/1609.03499, 2016a) and SampleRNN (Mehri et al., SampleRNN: An unconditional end-to-end neural audio generation model. CoRR, abs/1612.07837, 2016) are examples of the recent advances in autoregressive models. They have proven to be effective at modeling short and medium scale (~500 ms) signals, but, in some instances, rely on external conditioning for longer-term dependencies.

The autoencoder approach of the present disclosure removes the need for that external conditioning. In some implementations, it includes a WaveNet-like encoder neural network that infers hidden embeddings distributed in time and a WaveNet-like decoder that uses those embeddings to effectively reconstruct the original audio. This structure allows the size of an embedding to scale with the size of the input and encode over much longer time scales.

Recent breakthroughs in generative modeling of images have been predicated on the availability of high-quality and large-scale datasets such as MNIST, SVHN, CIFAR, and ImageNet. While generative models are notoriously hard to evaluate, these datasets provide a common test bed for consistent qualitative and quantitative evaluation, such as with the use of the Inception score.

There is a need for an audio dataset that was as approachable as those in the image domain. Audio signals found in the wild contain multi-scale dependencies that prove particularly difficult to model, leading many previous efforts at data-driven audio synthesis to focus on more constrained domains such as texture synthesis or training small parametric models.

Inspired by the large, high-quality image datasets, the NSynth dataset is an order of magnitude larger than comparable public datasets. It consists of ~300 k four-second annotated notes sampled at 16 kHz from ~1 k harmonic musical instruments.

After introducing example models and describing the dataset, the present disclosure provides example evaluations of the performance of example implementations of the autoencoder approach provided by the present disclosure over a baseline convolutional autoencoder model trained on spectrograms. The tasks of reconstruction and interpolation are examined and the learned space of embeddings is analyzed.

2. Example Models

FIG. 1A depicts an example neural synthesizer 10 according to example embodiments of the present disclosure. In particular, FIG. 1A shows a structure of the neural synthesizer 10 during training, in which the neural synthesizer 10 has an autoencoder structure that includes an encoder neural network 12 and a decoder neural network 14.

To train the neural synthesizer 10, an input audio waveform 16 is provided to the encoder neural network 12. The input audio waveform 16 can be an audio waveform that includes or represents music. For example, in some implementations, the input audio waveform 16 can be a four-second annotated note from a particular instrument (e.g., a waveform from the NSynth dataset). In some implementations, the entire waveform 16 is provided to the encoder neural network 12.

In some implementations, the encoder neural network 12 can include one or more convolutional layers. For example, the encoder neural network 12 can include a stack of one or more non-causal convolutional layers and/or dilated convolutional layers.

In response to receipt of the input audio waveform, the encoder neural network 12 can provide an embedding 20. For example, the embedding 20 can be provided at a final layer of the encoder neural network 12 or a close to final but not final (e.g., penultimate) layer of the encoder neural network 12. In some implementations, the embedding 20 can describe—within a learned embedding space—one or more musical characteristics (e.g., timbre) of the input audio waveform 16.

The embedding 20 and at least a portion 18 of the input audio waveform 16 can be provided to the decoder neural network. For example, the portion 18 can be missing one or more audio samples. In some implementations, pitch information 22 can also be provided to the network 14. For example, the embedding 20 and the pitch information 22 can be concatenated. In some implementations, the embedding 20 can be upsampled to an original resolution associated with the input audio waveform 16.

In some implementations, the decoder neural network 14 can be conditioned on the embedding 20. In some implementations, each of one or more layers of the decoder neural network 14 can be biased using the embedding 20. For example, every layer of the decoder neural network 14 can be biased with a different linear projection of the temporal embeddings 20 and/or 22.

In some implementations, the decoder neural network 14 can include one or more convolutional layers. For example, the decoder neural network 14 can include a stack of one or more causal convolutional layers and/or dilated convolutional layers. In one example, the decoder neural network 14 can have a structure highly similar to that of the WaveNet generative model. In some implementations, the decoder neural network 14 does not include any pooling layers. In some implementations, the output of the decoder neural network 14 has the same time dimensionality as the input.

The decoder neural network 14 can predict and provide a next sequential audio sample 24. In particular, the decoder neural network 14 can predict and provide the next sequential audio sample 24 that should follow after the portion 18 of the input audio waveform 16. The decoder 14 can autoregressively generate the next sequential audio sample 24 based on the samples of the portion 18 of the input audio waveform 16. In some implementations, the decoder neural network 14 can output a categorical distribution over the next sequential audio sample 24 with a softmax layer and is optimized to maximize the log-likelihood of the data with respect to the parameters.

A ground-truth audio sample 26 can be obtained from the input audio waveform 16. In particular, the ground-truth audio sample 26 can be the audio sample that came next sequentially following the portion 18 of the input audio waveform.

A loss function 28 can compare (e.g., evaluate a difference between) the next sequential audio sample 24 provided by the decoder neural network 14 and the ground-truth audio sample 26. The decoder neural network 14 and the encoder neural network 12 can be jointly trained on the loss function 28. For example, the loss function 28 can be backpropagated through the decoder neural network 14 and then continuing through the encoder neural network 12.

In some implementations, the neural synthesizer 10 can be trained in parallel using multiple different portions 18 of the input audio waveform 16, since the entirety of the audio waveform 16 is known in advance.

FIG. 1B depicts an example neural synthesizer according to example embodiments of the present disclosure. In particular, FIG. 1B illustrates use of the decoder neural network 14 after training has been completed.

An embedding 152 and a seed waveform 154 can be provided to the decoder neural network 14. The embedding 152 can be descriptive of one or more desired audio characteristics (e.g., a desired timbre, tone, tempo, style, etc.). For example, the embedding 152 can be selected from a database of available pre-constructed embeddings; generated through interpolation of other embeddings (e.g., trumpet embedding+sitar embedding); can be inferred (e.g., through use of the encoder neural network 12) from a particular audio waveform that exhibits the desired audio characteristics; or through other techniques.

Pitch information 156 can also be optionally provided and can, in some implementations, be concatenated with the embedding 152. As one example, the seed waveform 154 can be a string of zeros.

The decoder neural network 14 can be conditioned on the embedding 152. In some implementations, each of one or more layers of the decoder neural network 14 can be biased using the embedding 152. For example, every layer of the decoder neural network 14 can be biased with a different linear projection of temporal embeddings 152 and/or 156.

The decoder neural network 14 can provide a next sequential audio sample 158. In particular, the decoder neural network 14 can autoregressively generate the next sequential audio sample 158 based on the seed waveform 154 and the embedding 152. The next sequential audio sample 158 can be added or concatenated to the seed waveform 154 and again provided to the decoder neural network 14. In such fashion, raw musical audio waveforms can be autoregressively generated one sample at a time. The generated waveform will exhibit the desired audio characteristics encoded within the embedding 152.

2.1. Example WaveNet Autoencoder

WaveNet (van den Oord et al., WaveNet: A generative model for raw audio. CoRR, abs/1609.03499, 2016a) is a powerful generative approach to probabilistic modeling of raw audio. In this section, a novel neural synthesis autoencoder structure of the present disclosure is described. The primary motivation for this approach is to attain consistent long-term structure without external conditioning. A secondary motivation is to use the learned encodings for applications such as meaningful audio interpolation.

Recalling the original WaveNet architecture described in van den Oord et al., WaveNet: A generative model for raw audio. CoRR, abs/1609.03499, 2016a, at each step a stack of dilated convolutions predicts the next sample of audio from a fixed-size input of prior sample values. The joint probability of the audio x is factorized as a product of conditional probabilities:

$$p(x) = \prod_{i=1}^{N} p(x_i | x_1, \ldots, x_{N-1})$$

Unconditional generation from this model manifests as "babbling" due to the lack of longer term. However, it was shown that in the context of speech that long-range structure can be enforced by conditioning on temporally aligned linguistic features.

Figure 1D:
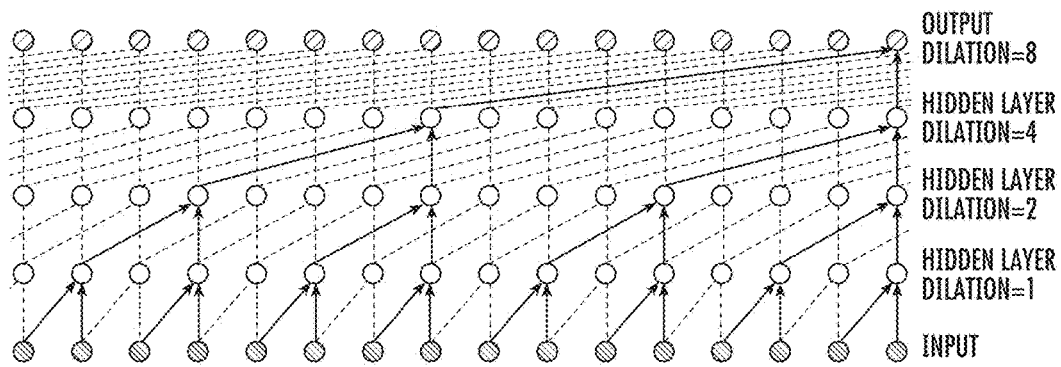
FIG. 1D depicts example dilated convolutional causal layers according to example embodiments of the present disclosure.
Figure 1E:
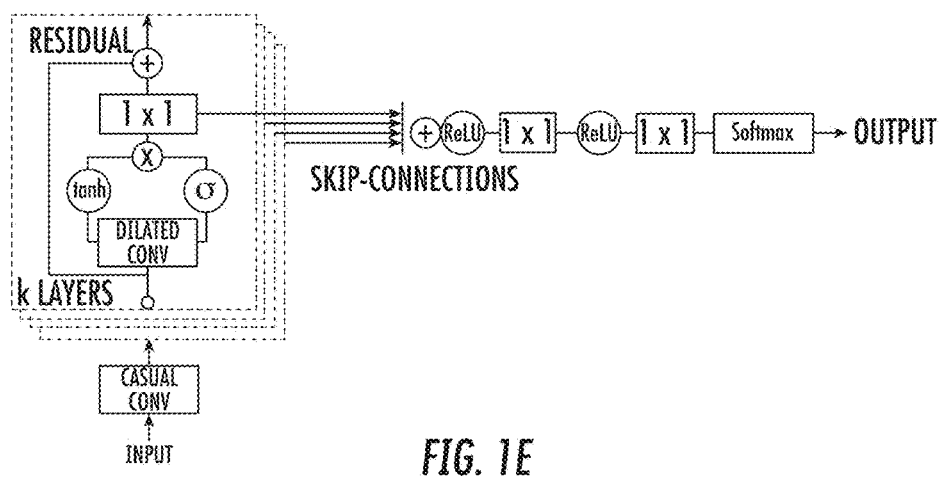
FIG. 1E depicts an example residual block according to example embodiments of the present disclosure.
Figure 1F:
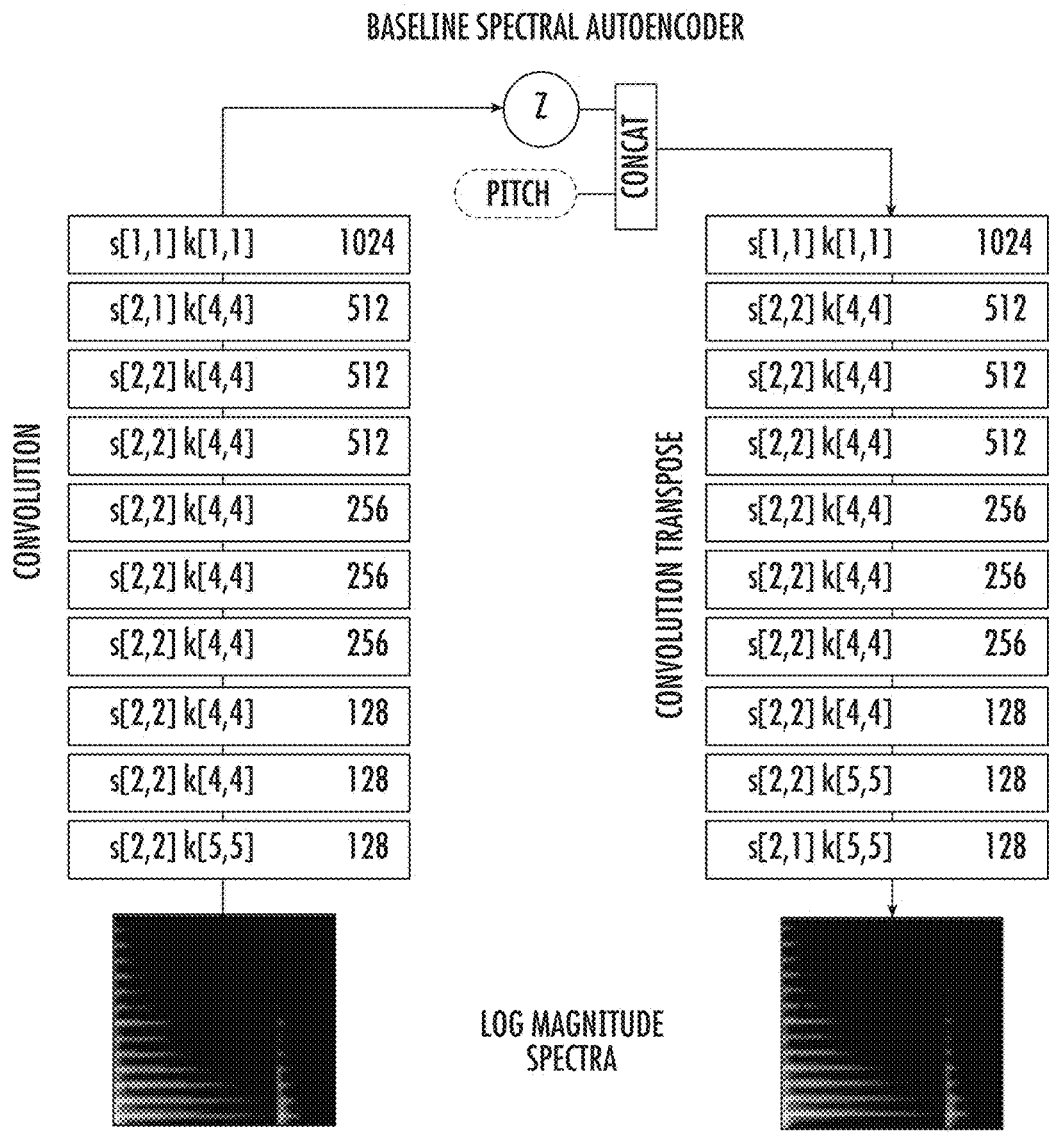
FIG. 1F depicts an example baseline spectral autoencoder according to example embodiments of the present disclosure.
Figure 1G:
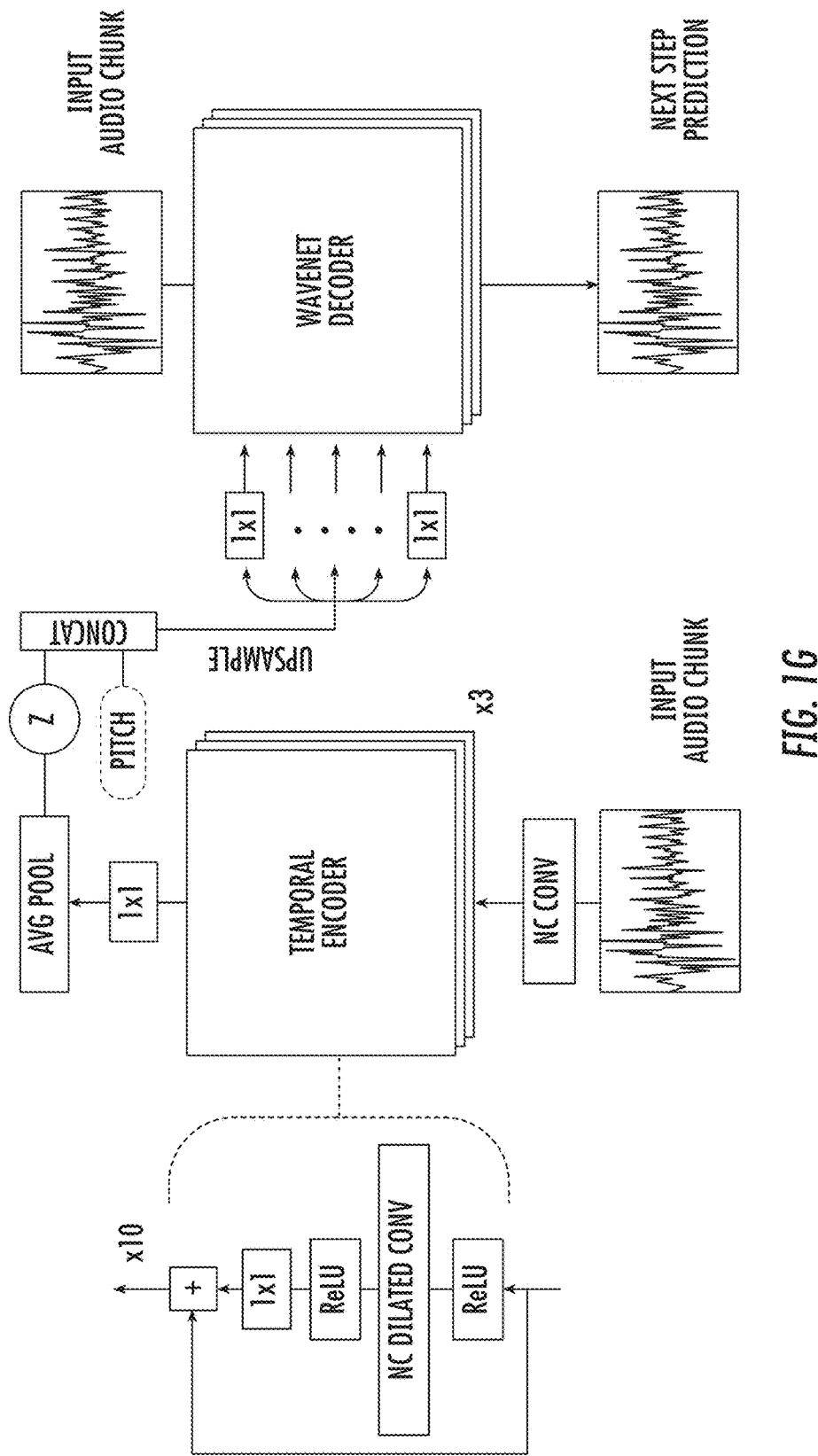
FIG. 1G depicts an example neural synthesis autoencoder according to example embodiments of the present disclosure.

FIG. 1G depicts an example neural synthesis autoencoder according to example embodiments of the present disclosure. The neural synthesis autoencoder of FIG. 1G removes the need for external conditioning. The autoencoder works by taking a raw audio waveform as input from which the encoder produces an embedding $Z=f(x)$. Next, the same input can be causally shifted and fed into the decoder, which reproduces the input waveform. The joint probability is now:

$$p(x) = \prod_{i=1}^{N} p(x_i | x_1, \ldots, x_{N-1}, f(x))$$

The embedding Z can be parameterized as a latent variable $p(Z|x)$ that would have to be marginalized over, but in practice this has been found to be less effective. This may be due to the decoder being so powerful that it can ignore the latent variables unless they encode a much larger context that is otherwise inaccessible.

Note that the decoder could completely ignore the deterministic encoding and degenerate to a standard unconditioned WaveNet. However, because the encoding is a strong signal for the supervised output, the model learns to utilize it.

During inference, the decoder autoregressively generates a single output sample at a time conditioned on an embedding and a seed starting palette of zeros. The embedding can be inferred deterministically from audio or drawn from other points in the embedding space, e.g. through interpolation or analogy.

FIG. 1G depicts the model architecture in more detail. The temporal encoder model is a 30-layer nonlinear residual network of dilated convolutions followed by 1×1 convolutions. Each convolution has 128 channels and precedes a ReLU nonlinearity. The output feed into another 1×1 convolution before downsampling with average pooling to get the embedding or encoding Z. The encoding can be referred to as a 'temporal encoding' because the result is a sequence of hidden codes with separate dimensions for time and channel. The time resolution depends on the stride of the pooling. The stride can be tuned, keeping total size of the embedding constant (~32× compression).

In the trade-off between temporal resolution and embedding expressivity, one example sweet spot is found at a stride of 512 (32 ms) with 16 dimensions per timestep, yielding a 125×16 embedding for each NSynth note. Additional example models can be conditioned on global attributes by utilizing a one-hot pitch embedding.

Still referring to FIG. 1G, the WaveNet decoder model can be similar to that presented in van den Oord et al., WaveNet: A generative model for raw audio. CoRR, abs/1609.03499, 2016a. The decoder can be conditioned by biasing every layer with a different linear projection of the temporal embeddings. Since the decoder does not downsample anywhere in the network, the temporal encodings can be upsampled to the original audio rate with nearest neighbor interpolation. The input audio can be quantized using an 8-bit μ-law encoding as set forth above. Each output step can then be predicted with a softmax over the resulting 256 values.

More particularly, because raw audio is typically stored as a sequence of 16-bit integer values (one per timestep), a softmax layer would need to output 65,536 probabilities per timestep to model all possible values. To make this more tractable, a μ-law companding transformation can be applied to the data, and then the data can be quantized to 256 possible values:

$$\text{transformation}(x_t) = \text{sign}(x_t)\frac{\ln(1+\mu|x_t|)}{\ln(1+\mu)}$$

where $-1 < x_t < 1$ and $\mu = 255$. This non-linear quantization produces a significantly better reconstruction than a simple linear quantization scheme.

FIG. 1C depicts example causal convolutional layers according to example embodiments of the present disclosure. In particular, in some implementations, a main ingredient of the WaveNet-style models described herein (e.g., the decoder neural network) are causal convolutional layers. By using causal convolutions, the model cannot violate the ordering in which the data is modeled: the prediction p $(x_{t+1}|x_1; \ldots; x_t)$ emitted by the model at timestep t cannot depend on any of the future timesteps $x_{t+1}; x_{t+2}; \ldots; x_T$, as shown in FIG. 1C.

For images, the equivalent of a causal convolution is a masked convolution which can be implemented by constructing a mask tensor and doing an elementwise multiplication of this mask with the convolution kernel before applying it. For 1-D data such as audio one can more easily implement this by shifting the output of a normal convolution by a few timesteps.

At training time, the conditional predictions for all timesteps can be made in parallel because all timesteps of ground truth x are known. When generating with the model, the predictions are sequential: after each sample is predicted, it can be fed back into the network to predict the next sample.

Because models with causal convolutions do not have recurrent connections, they are typically faster to train than RNNs, especially when applied to very long sequences. One of the problems of causal convolutions is that they require many layers, or large filters to increase the receptive field. For example, in FIG. 1C the receptive field is only 5 (=#layers+filter length−1). Dilated convolutions can be used to increase the receptive field by orders of magnitude, without greatly increasing computational cost.

FIG. 1D depicts example dilated convolutional causal layers according to example embodiments of the present disclosure. A dilated convolution is a convolution where the filter is applied over an area larger than its length by skipping input values with a certain step. It is equivalent to a convolution with a larger filter derived from the original filter by dilating it with zeros, but is significantly more efficient. A dilated convolution effectively allows the network to operate on a coarser scale than with a normal convolution. This is similar to pooling or strided convolutions, but here the output has the same size as the input.

As a special case, dilated convolution with dilation 1 yields the standard convolution. FIG. 1D depicts dilated causal convolutions for dilations 1, 2, 4, and 8.

Stacked dilated convolutions enable networks to have very large receptive fields with just a few layers, while preserving the input resolution throughout the network as well as computational efficiency.

In some implementations of the present disclosure, the dilation can be doubled for every layer up to a limit and then repeated: e.g. 1; 2; 4; . . . ; 512; 1; 2; 4; . . . ; 512; 1; 2; 4; . . . ; 512:

The intuition behind this configuration is two-fold. First, exponentially increasing the dilation factor results in exponential receptive field growth with depth. For example each 1; 2; 4; . . . ; 512 block has receptive field of size 1024, and can be seen as a more efficient and discriminative (non-linear) counterpart of a 1×1024 convolution. Second, stacking these blocks further increases the model capacity and the receptive field size.

FIG. 1E depicts an example residual block according to example embodiments of the present disclosure. Both residual (see, e.g., He et al., Deep residual learning for image recognition. CoRR, abs/1512.03385, 2015) and parameterized skip connections can be used throughout the neural networks described herein, to speed up convergence and enable training of much deeper models. FIG. 1E shows an example residual block, which can be stacked many times in the network.

2.2. Example Baseline: Spectral Autoencoder

FIG. 1F depicts an example baseline spectral autoencoder according to example embodiments of the present disclosure. More particularly, as a point of comparison, the present disclosure provides a straightforward yet strong baseline for the neural audio synthesis experiments described herein. Convolutional autoencoder structures were explored with a bottleneck that forces the model to find a compressed representation for an entire note. FIG. 1F shows a block diagram of an example baseline architecture that is used as a point of comparison in the experiments described herein. The convolutional encoder and decoder are each 10 layers deep with 2×2 strides and 4×4 kernels. Every layer is followed by a leaky-ReLU (0.1) nonlinearity and batch normalization. The number of channels grows from 128 to 1024 before a linear fully-connected layer creates a single 19841 dimensional hidden vector (Z) to match that of an example WeveNet-style neural synthesis autoencoder that had a pooling stride of 1024 and a 62×32 embedding.

Still referring to the baseline autoencoder of FIG. 1F, given the simplicity of the architecture, a range of input representations were examined. Using the raw waveform as input with a mean-squared error (MSE) cost proved difficult to train and highlighted the inadequacy of the independent Gaussian assumption. Spectral representations such as the real and imaginary components of the Fast Fourier Transform (FFT) fared better, but suffered from low perceptual quality despite achieving low MSE cost. It was found that training on the log magnitude of the power spectra, peak normalized to be between 0 and 1, correlated better with perceptual distortion.

Several representations of phase were also explored, including instantaneous frequency and circular normal cost functions (see Section 6), but in each case independently estimating phase and magnitude led to poor sample quality due to phase errors. A large improvement can be achieved by estimating only the magnitude and using a well-established iterative technique to reconstruct the phase. To get the best results, a large FFT size (1024) was used relative to the hop size (256) and the algorithm was run for 1000 iterations. As a final heuristic, the MSE loss was weighted, starting at 10 for 0 Hz and decreasing linearly to 1 at 4000 Hz and above. At the expense of some precision in timbre, this created more phase coherence for the fundamentals of notes, where errors in the linear spectrum lead to a larger relative error in frequency.

2.3. Example Training

All models used in the example experiments were trained with stochastic gradient descent with an Adam optimizer. The baseline models commonly use a learning rate of 1e-4, while the WaveNet-style autoencoder models use a schedule, starting at 2e-4 and descending to 6e-5, 2e-5, and 6e-6 at iterations 120 k, 180 k, and 240 k respectively. The baseline models train asynchronously for 1800 k iterations with a batch size of 8. The WaveNet models train synchronously for 250 k iterations with a batch size of 32.

3. The NSynth Dataset

To evaluate the neural synthesis autoencoder models of the present disclosure, an audio dataset that enabled exploration of the learned embeddings was needed. Musical notes are an ideal setting for this study as the embeddings will capture structure such as pitch, dynamics, and timbre. While several smaller datasets currently exist, deep networks train better on abundant, high-quality data, motivating the development of a new dataset.

3.1. A Dataset of Musical Notes

NSynth consists of 306,043 musical notes, each with a unique pitch, timbre, and envelope. For 1006 instruments from commercial sample libraries, four second, monophonic 16 kHz audio snippets were generated, referred to as notes, by ranging over every pitch of a standard MIDI piano (21-108) as well as five different velocities (25, 50, 75, 100, 127). MIDI velocity is similar to volume control and they have a direct relationship. For physical intuition, higher velocity corresponds to pressing a piano key harder.

The note was held for the first three seconds and allowed to decay for the final second. Some instruments are not capable of producing all 88 pitches in this range, resulting in an average of 65.4 pitches per instrument. Furthermore, the commercial sample packs occasionally contain duplicate sounds across multiple velocities, leaving an average of 4.75 unique velocities per pitch.

3.2. Example Annotations

Each of the notes was also annotated with three additional example pieces of information based on a combination of human evaluation and heuristic algorithms:

Source: The method of sound production for the note's instrument. This can be one of 'acoustic' or 'electronic' for instruments that were recorded from acoustic or electronic instruments, respectively, or 'synthetic' for synthesized instruments.

Family: The high-level family of which the note's instrument is a member. Each instrument is a member of exactly one family. See Section 6 for the complete list.

Qualities: Sonic qualities of the note. See Section 6 for the complete list of classes and their co-occurrences. Each note is annotated with zero or more qualities.

4. Example Evaluation

The models were evaluated and analyzed on the tasks of note reconstruction, instrument interpolation, and pitch interpolation.

Audio is notoriously hard to represent visually. Magnitude spectrograms capture many aspects of a signal for analytics, but two spectrograms that appear very similar to the eye can correspond to audio that sound drastically different due to phase differences.

That said, in the analysis, examples are presented as plots of the constant-q transform (CQT), which is useful because it is shift invariant to changes in the fundamental frequency. In this way, the structure and envelope of the overtone series (higher harmonics) determines the dynamics and timbre of a note, regardless of its base frequency. However, due to the logarithmic binning of frequencies, transient noise-like impulses appear as rainbow "pyramidal spikes" rather than straight broadband lines. CQTs are displayed with a pitch range of 24-96 (C2-C8), hop size of 256, 40 bins per octave, and a filter scale of 0.8.

As phase plays such an essential part in sample quality, both magnitude and phase are shown on the same plot. The intensity of lines is proportional to the log magnitude of the power spectrum while the color is given by the derivative of the unrolled phase ('instantaneous frequency'). The derivative of the phase is displayed because it creates a solid continuous line for a harmonic of a consistent frequency. This is understandable since if the instantaneous frequency of a harmonic ($f_{harm}$) and an FFT bin ($f_{bin}$) are not exactly equal, each timestep will introduce a constant phase shift, $$\Delta \varphi = (f_{bin} - f_{harm}) \frac{\text{hopsize}}{\text{samplerate}}.$$

The present disclosure refers to these instantaneous frequency colored spectrograms as "Rainbowgrams" due to their tendency to form rainbows as the instantaneous frequencies modulate up and down.

4.1. Example Reconstructions

Figure 2:
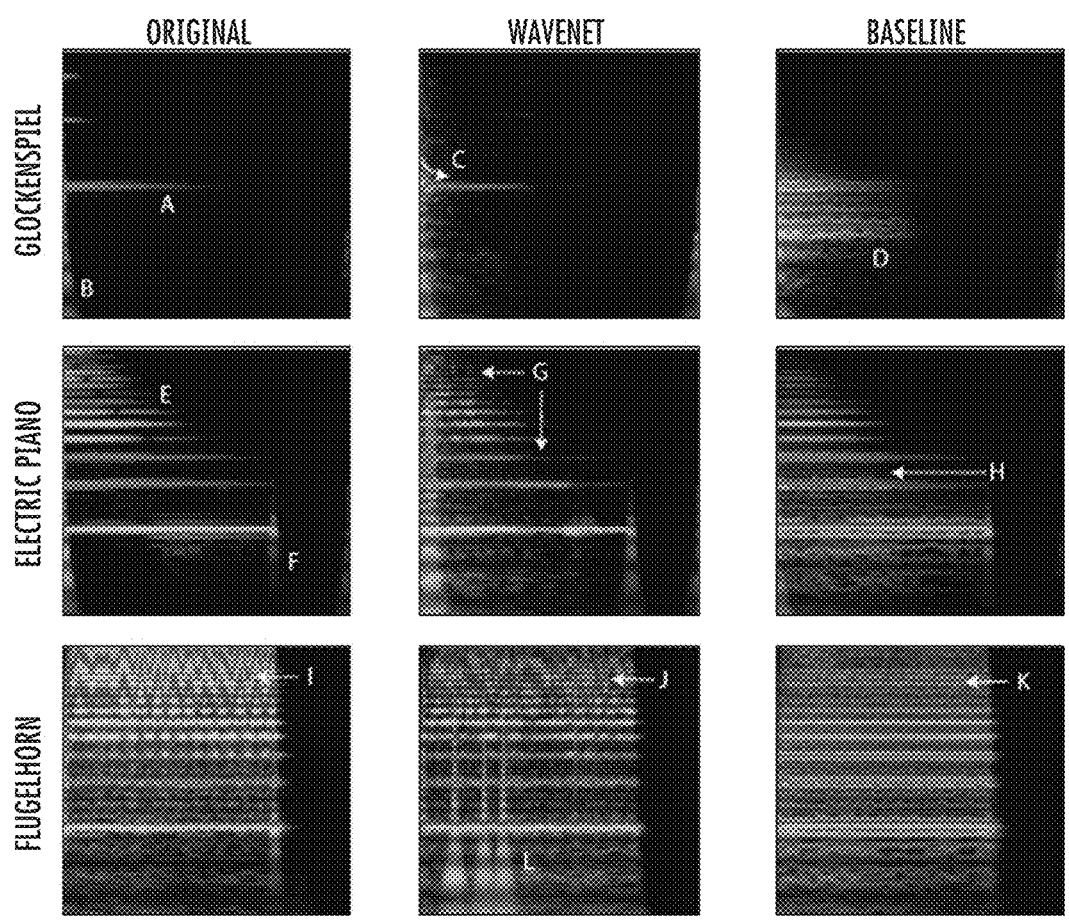
FIG. 2 depicts example reconstructions of notes from three different instruments according to example embodiments of the present disclosure.

FIG. 2 displays example rainbowgrams for notes from three different instruments in the holdout set, where the original notes are on the first column and the model reconstructions are on the second and third columns. Each note is displayed as a "Rainbowgram", a CQT spectrogram with intensity of lines proportional to the log magnitude of the power spectrum and color given by the derivative of the phase. Time is on the horizontal axis and frequency on the vertical axis.

Each note has a similar structure with some noise on onset, a fundamental frequency with a series of harmonics, and a decay. For all the WaveNet-style models, there is a slight built-in distortion due to the compression of the μ-law encoding. It is a minor effect for many samples, but is more pronounced for lower frequencies.

While each rainbowgram matches the general contour of the original note, a pronounced difference in sample quality can be heard and can be ascribed to certain features. For the Glockenspiel, the WaveNet-style neural synthesis autoencoder reproduces the magnitude and phase of the fundamental (solid blue stripe, (A)), and also the noise on attack (vertical rainbow spike (B)). There is a slight error in the fundamental as it starts a little high and quickly descends to the correct pitch (C). In contrast, the baseline has a more percussive, multitonal sound, similar to a bell or gong. The fundamental is still present, but so are other frequencies, and the phases estimated from the Griffin-Lim procedure are noisy as indicated by the blurred horizontal rainbow texture (D).

The electric piano has a more clearly defined harmonic series (the horizontal rainbow solid lines, (E)) and a noise on the beginning and end of the note (vertical rainbow spikes, (F)). Listening to the sound, it is slightly distorted, which promotes these upper harmonics. Both the neural synthesis autoencoder and the baseline produce rainbowgrams with similar shapes to the original, but with different types of phase artifacts. The WaveNet-style model has sufficient phase structure to model the distortion, but has a slight wavering of the instantaneous frequency of some harmonics, as seen in the color change in harmonic stripes (G). In contrast, the baseline lacks the structure in phase to maintain the punchy character of the original note, and produces a duller sound that is slightly out of tune. This is represented in the less brightly colored harmonics due to phase noise (H).

The flugelhorn displays perhaps the starkest difference between the two models. The sound combines rich harmonics (many lines), non-tonal wind and lip noise (background color), and vibrato oscillation of pitch that results in a corresponding rainbow of color in all of the harmonics. While the neural synthesis autoencoder does not replicate the exact trace of the vibrato (I), it creates a very similar rainbowgram with oscillations in the instantaneous frequency at all levels synced across the harmonics (J). This results in a rich and natural sounding reconstruction with all three aspects of the original sound. The baseline, by comparison, is unable to model such structure. It creates a more or less correct harmonic series, but the phase has lots of random perturbations. Visually this shows up as colors which are faded and speckled with rainbow noise (K), which contrasts with the bright colors of the original and WaveNet-style examples. Acoustically, this manifests as an unappealing buzzing sound laid over an inexpressive and consistent series of harmonics. The WaveNet-style model also produces a few inaudible discontinuities visually evidenced by the vertical rainbow spikes (L).

4.1.1. Example Quantitative Comparison

A multi-task classification network was trained to perform a quantitative comparison of the model reconstructions by predicting pitch and quality labels on the NSynth dataset (details in Section 6). The network configuration is the same as the baseline encoder and testing is done on reconstructions of a randomly chosen subset of 4096 examples from the held-out set.

TABLE 1

Classification accuracy of a deep nonlinear pitch and quality classifier on reconstructions of a test set.

|  | Pitch | Quality |
| --- | --- | --- |
| Original Audio | 91.6% | 90.1% |
| WaveNet-style Reconstruction | 79.6% | 88.9% |
| Baseline Reconstruction | 46.9% | 85.2% |

The results in Table 1 confirm the qualitative observation that the WaveNet-style reconstructions are of superior quality. The classifier is ~70% more successful at extracting pitch from the reconstructed WaveNet-style samples than the baseline and several points higher for predicting quality information, giving an accuracy roughly equal to the original audio.

4.2. Example Interpolation in Timbre and Dynamics

Figure 3:
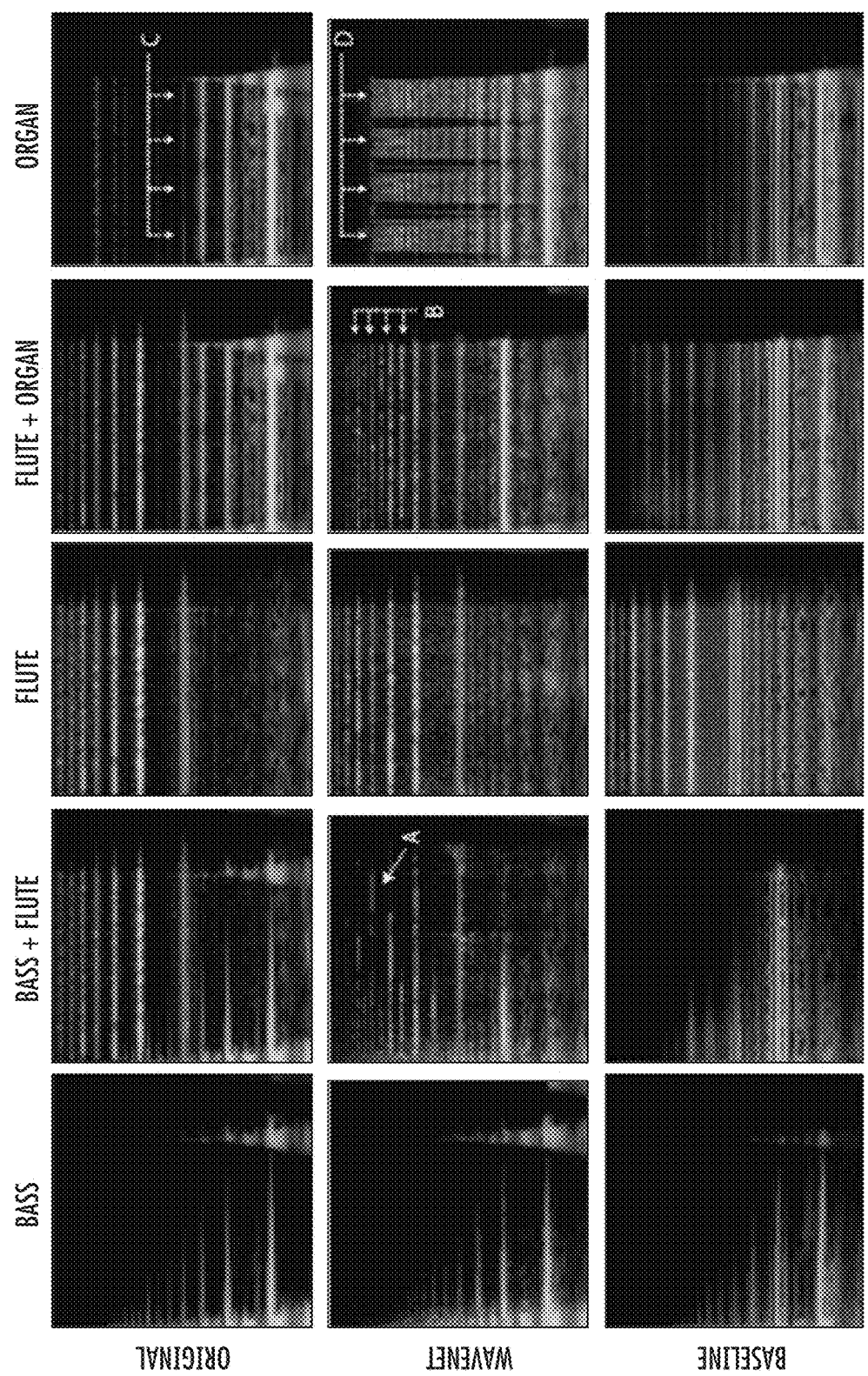
FIG. 3 depicts example rainbowgrams of linear interpolations between three different notes from instruments according to example embodiments of the present disclosure.

Given the limited factors of variation in the dataset, a successful embedding space (Z) should span the range of timbre and dynamics in its reconstructions. In FIG. 3, reconstructions from linear interpolations (0.5:0.5) are shown in the Z space among three different instruments. Additionally, these are compared to interpolations in the original audio space. The latter are simple super-positions of the individual instruments' rainbowgrams. This is perceptually equivalent to the two instruments being played at the same time.

In contrast, the generative models fuse aspects of the instruments. As was illustrated in Section 4.1, the WaveNet-style neural synthesis autoencoder models the data much more realistically than the baseline, so it is no surprise that it also learns a manifold of codes that yield more perceptually interesting reconstructions.

For example, in the interpolated note between the bass and flute (FIG. 3, column 2), both the baseline and WaveNet-style models blend the harmonic structure of the two instruments while imposing the amplitude envelope of the bass note onto the upper harmonics of the flute note. However, the WaveNet model goes beyond this to create a dynamic mixing of the overtones in time, even jumping to a higher harmonic at the end of the note (A). This sound captures expressive aspects of the timbre and dynamics of both the bass and flute, but is distinctly separate from either original note. This contrasts with the interpolation in audio space, where the dynamics and timbre of the two notes is independent. The baseline model also introduces phase distortion similar to those in the reconstructions of the bass and flute.

This phenomenon is exhibited again in the interpolation between flute and organ (FIG. 3, column 4). Both models also seem to create new harmonic structure, rather than just overlay the original harmonics. The WaveNet-style model adds additional harmonics as well as a sub-harmonic to the original flute note, all while preserving phase relationships (B). The resulting sound has the breathiness of a flute, with the upper frequency modulation of an organ. By contrast, the lack of phase structure in the baseline leads to a new harmonic yet dull sound lacking a unique character.

The WaveNet-style model additionally has a tendency to exaggerate amplitude modulation behavior, while the baseline suppresses it. If the original organ sound is examined (FIG. 3, column 5), a subtle modulation can be seen which is signified by the blue harmonics periodically fading to black (C). The baseline model misses this behavior completely as it is washed out. Conversely, the WaveNet-style model amplifies the behavior, adding in new harmonics not present in the original note and modulating all the harmonics. This is seen in the figure by four vertical black stripes that align with the four modulations of the original signal (D).

4.3. Example Entanglement of Pitch and Timbre

By conditioning on pitch during training, multiple pitches can be generated from a single Z vector that preserves the identity of timbre and dynamics. This concept is investigated further with classification and correlation studies.

4.3.1. Example Pitch Classification from Z

One way to study the entanglement of pitch and Z is to consider the pitch classification accuracy from embeddings. If training with pitch conditioning disentangles the representation of pitch and timbre, then a linear pitch classifier trained on the embeddings would be expected to drop in accuracy. To test this, a series of baseline autoencoder models were trained with different embedding sizes, both with and without pitch conditioning. For each model, a logistic regression pitch classifier was then trained on its embeddings and tested on a random sample of 4096 held-out embeddings.

TABLE 2

Classification accuracy (in percentage) of a linear pitch classifier trained on learned embeddings. The decoupling of pitch and embedding becomes more pronounced at smaller embedding sizes as shown by the larger relative decrease in classification accuracy.

|  | Z Size | No Pitch Cond. | Pitch Cond. | Relative Change |
|---|---|---|---|---|
| WaveNet-Style | 1984 | 58.1 | 40.5 | −30.4 |
| Baseline | 1984 | 63.8 | 55.2 | −13.5 |
| Baseline | 1024 | 57.4 | 42.1 | −23.7 |
| Baseline | 512 | 63.2 | 21.8 | −65.5 |
| Baseline | 256 | 57.7 | 21.0 | −63.6 |
| Baseline | 128 | 58.2 | 21.2 | −63.6 |
| Baseline | 64 | 59.8 | 15.2 | −74.6 |

The first two rows of Table 2 demonstrate that the baseline and WaveNet-style models decrease in classification accuracy by 13-30% when adding pitch conditioning during training. This is indicative a reduced presence of pitch information in the latent code and thus a decoupling of pitch and timbre information. Further, as the total embedding size decreases below 512, the accuracy drop becomes much more pronounced, reaching a 75% relative decrease. This is likely due to the greater expressivity of larger embeddings, where there is less to be gained from utilizing the pitch conditioning. However, as the embedding size decreases, so too does reconstruction quality. This is more pronounced for the WaveNet-style models, which have farther to fall in terms of sample quality.

Figure 4:
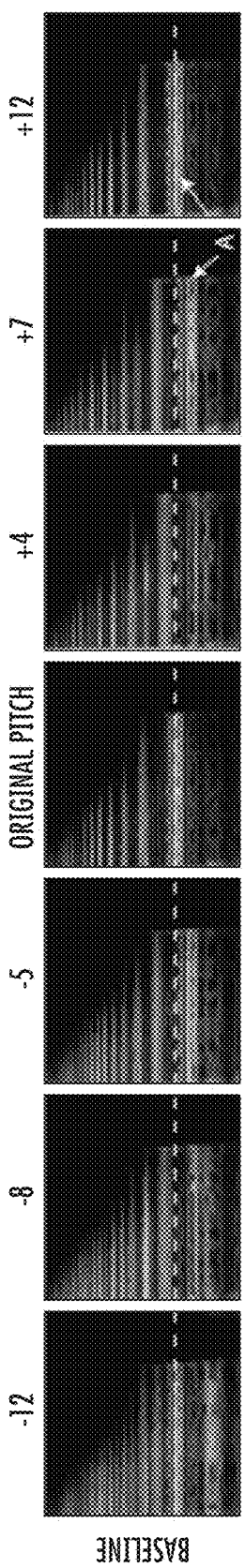
FIG. 4 depicts example rainbowgrams with conditioning on pitch according to example embodiments of the present disclosure.

As a proof of principle, for a baseline model with an embedding size of 128, reconstruction quality and response to conditioning are able to be balanced. FIG. 4 demonstrates two octaves of a C major chord created from a single embedding of an electric piano note, but conditioned on different pitches. The resulting harmonic structure of the original note is only partially preserved across the range. As the pitch is shifted upwards, a sub-harmonic emerges (A) such that the pitch +12 note is similar to the original except that the harmonics of the octave are accentuated in amplitude. This aligns with the pitch classification results, where it was found that pitches are most commonly confused with those one octave away (see Section 6). These errors can account for as much as 20% absolute classification error.

FIG. 4. Conditioning on pitch. These rainbowgrams are reconstructions of a single electric piano note from the holdout set. They were synthesized with the baseline model (128 hidden dimensions). By holding Z constant and conditioning on different pitches, two octaves of a C major chord can be played from a single embedding. The original pitch (MIDI C60) is dashed in white for comparison.

4.3.2. Example Z Correlation across Pitch

Figure 5:
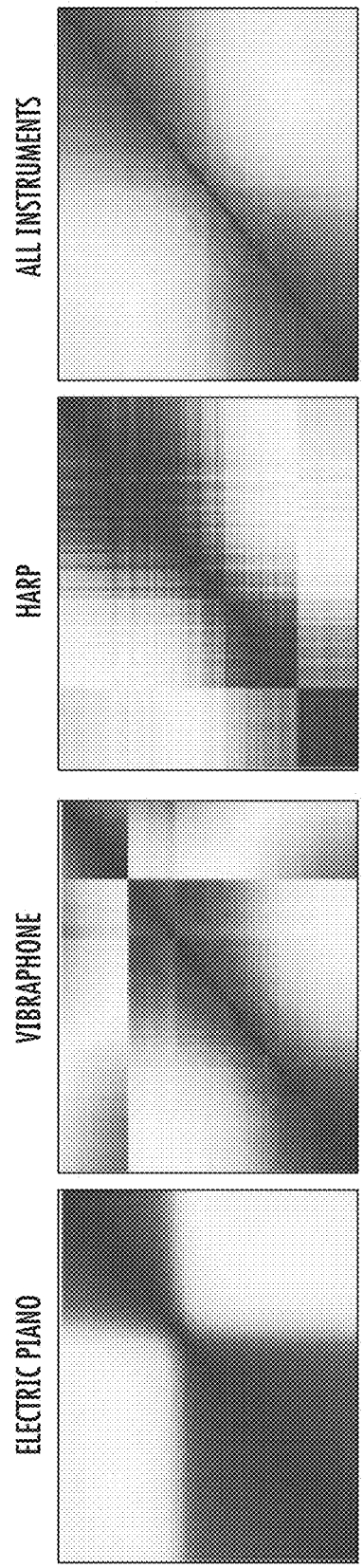
FIG. 5 depicts example visualizations of correlation of embeddings across pitch according to example embodiments of the present disclosure.

Further insight into the relationship between timbre and pitch can be gained by examining the correlation of WaveNet-style embeddings among pitches for a given instrument. FIG. 5 shows correlations for several instruments across their entire 88 note range at velocity 127. Each instrument has a unique partitioning into two or more registers over which notes of different pitches have similar embeddings. Even the average over all instruments shows a broad distinction between high and low registers. On reflection, this is unsurprising as the timbre and dynamics of an instrument can vary dramatically across its range. These embeddings were taken from a WaveNet-style model trained without pitch conditioning.

4.4. Example Generalization of Temporal Encodings

The neural synthesis autoencoder model has some unique properties that allow it to generalize to situations not in the dataset. Since the model learns embeddings that bias an autoregressive decoder, they effectively act as a "driving function" for a nonlinear oscillator/infinite impulse response filter. This is made clear by FIG. 6, where the embeddings follow a magnitude contour similar to that of the rainbowgrams of their corresponding sounds in FIGS. 2 and 3.

Figure 6:
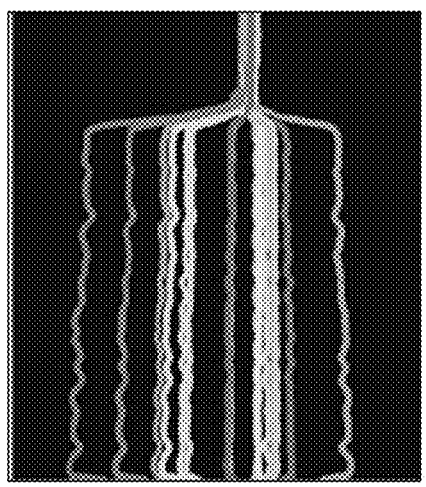
FIG. 6 depicts example temporal embeddings for different instruments according to example embodiments of the present disclosure.
Figure 6:
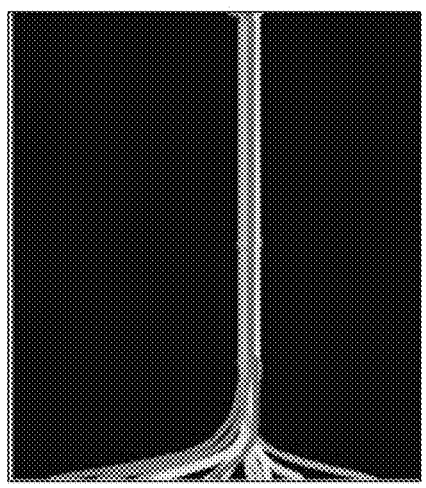
Figure 6:
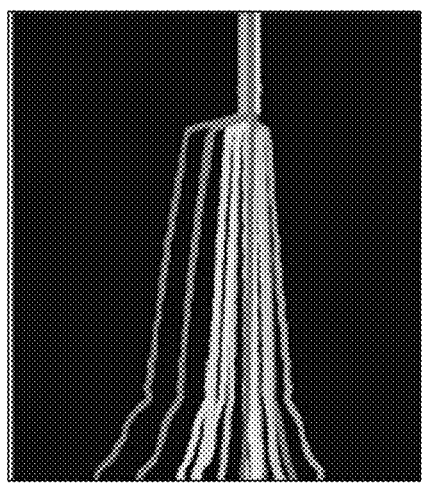

FIG. 6 depicts example temporal embeddings for three different instruments. The different colors represent the 16 different dimensions of the embeddings for 125 timesteps (each 32 ms). Note that the embedding have a contour similar to the magnitude contour of the original note and decay close to zero when there is no sound. With this in mind, they can be thought of as a "driving function" for a nonlinear oscillator/infinite impulse response filter.

Further, much like a spectrogram, the embeddings only capture a local context. This lets them generalize in time. The model has only ever seen single notes with sound that lasts for up to three seconds, and yet FIG. 7 demonstrates that it can successfully reconstruct both a whole series of notes, as well as notes played for longer than three seconds.

Figure 7:
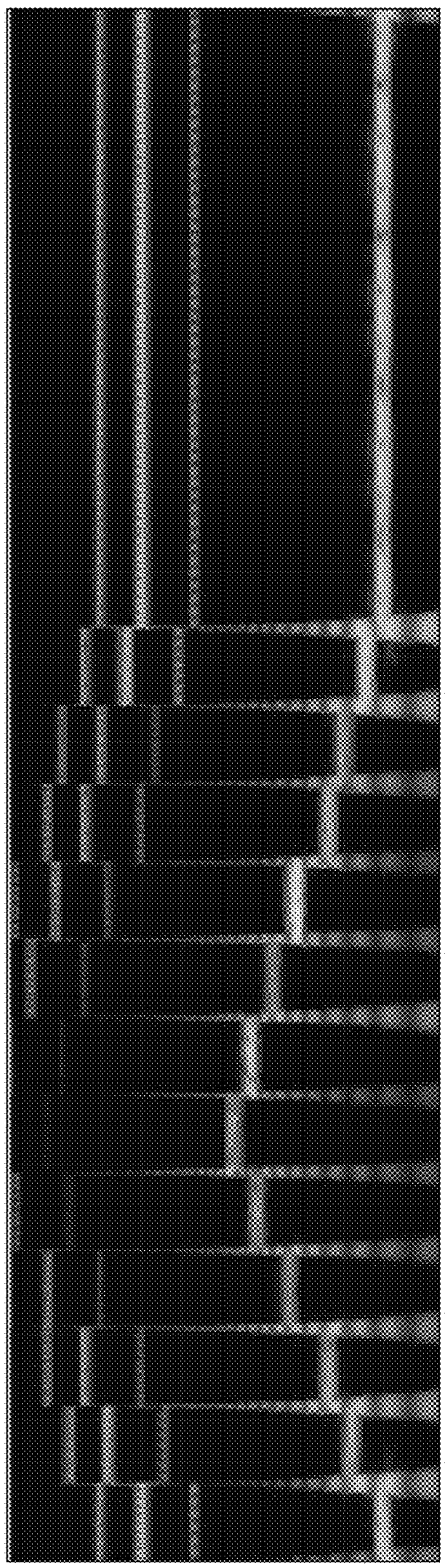
FIG. 7 depicts example rainbowgrams of a series of notes according to example embodiments of the present disclosure.
Figure 7:
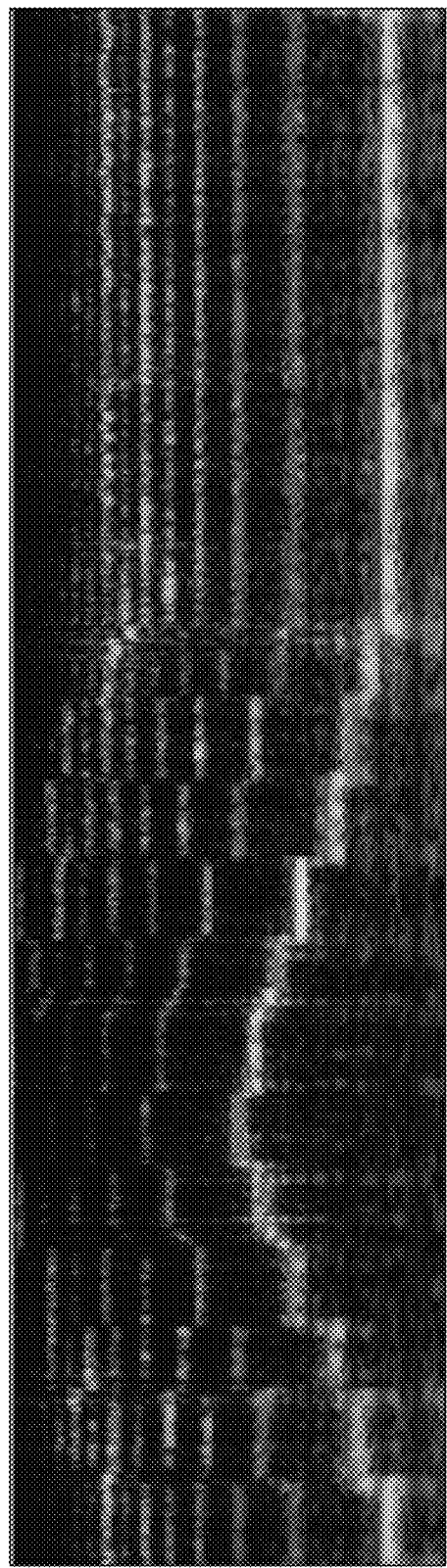

FIG. 7 depicts example rainbowgrams of a series of notes reconstructed by the neural synthesis autoencoder. The example model being tested was never trained on more than one note at a time or on clips longer than four seconds, but it does a fair job of reconstructing this ten-second long scale.

While the WaveNet-style neural synthesis autoencoder adds more harmonics to the original timbre of the organ instrument, it follows the fundamental frequency as it plays up two octaves of a C major arpeggio, back down a G dominant arpeggio, and holds for several seconds on the base note. The fact that it has never seen a transition between two notes is clear, as the fundamental frequency actually glissandos smoothly between new notes.

5. Example Discussion

The present disclosure provides a neural synthesis autoencoder model that captures long term structure without the need for external conditioning. The model's effectiveness is demonstrated on the new NSynth dataset for generative modeling of audio.

The neural synthesis autoencoder of the present disclosure is a powerful representation for which there remain multiple avenues of exploration. It builds upon the fine-grained local understanding of the original WaveNet work and provides access to a useful hidden space.

NSynth was inspired by image recognition datasets that have been core to recent progress in deep learning. Similar to how many image datasets focus on a single object per example, NSynth hones in on a single note. Indeed, much modern music production employs such a factorization, using MIDI for note sequences and software synthesizers for timbre. Note-to-note dependencies can be partly restored by passing sequence-level timbre and dynamics information to the note-level synthesizer. While not perfect, this factorization is based on the physics of many instruments and is surprisingly effective.

NSynth can be used a benchmark and entry point into audio machine learning. NSynth is also a building block for future datasets such as a high-quality multi-note dataset for tasks like generation and transcription that involve learning complex language-like dependencies.

6. Additional Information

6.1. Example Phase Representation for the Baseline Model

Several audio representations were explored for the baseline model. Each representation uses an MSE cost and always includes the magnitude of the STFT spectrogram. Training on the peak-normalized log magnitude of the power spectra correlated better with perceptual distortion. When using phase in the objective, the phase angle was regressed upon. A circular normal distribution can be assumed for the phase with a log likelihood loss proportional to:

$$\cos(\pi*(x-\hat{x})).$$

FIG. 8 shows CQT spectrograms of reconstructions of a trumpet sound from models trained on each input representation. For Griffin-Lim, only the magnitude is modeled, and 1000 iterations of an iterative technique is used to estimate the phase.

6.2. Description of Example Quality Tags

Quality annotations were provided for the 10 different note qualities described below. None of the tags are mutually exclusive by definition except for Bright and Dark. However, it is possible for a note to be neither Bright nor Dark. The following are example annotations. Other annotations can be used additionally and or alternatively.

Bright: A large amount of high frequency content and strong upper harmonics.

Dark: A distinct lack of high frequency content, giving a muted and bassy sound. Also sometimes described as 'Warm'.

Distortion: Waveshaping that produces a distinctive crunchy sound and presence of many harmonic. Sometimes paired with non-harmonic noise.

Fast Decay: Amplitude envelope of all harmonics decays substantially before the 'note-off' point at 3 seconds.

Long Release: Amplitude envelope decays slowly after the 'note-off' point, sometimes still present at the end of the sample at 4 seconds.

Multiphonic: Presence of overtone frequencies related to more than one fundamental frequency.

Non-Linear Envelope: Modulation of the sound with a distinct envelope behavior different than the monotonic decrease of the note. Can also include filter envelopes as well as dynamic envelopes.

Percussive: A loud non-harmonic sound at note onset.

Reverb: Room acoustics that were not able to be removed from the original sample.

Tempo-Synced: Rhythmic modulation of the sound to a fixed tempo.

TABLE 3

Instrument annotations. Instruments are labeled with both a source and a family. The source denotes how each instrument's notes are generated: acoustic instrument, electronic instrument, or by software synthesis. The family denotes a high-level class for each instrument.

| Family | Source | | | |
|---|---|---|---|---|
| | Acoust. | Electr. | Synth | Total |
| Bass | 200 | 8387 | 60368 | 68955 |
| Brass | 13760 | 70 | 0 | 13830 |
| Flute | 6572 | 70 | 2816 | 9458 |
| Guitar | 13343 | 16805 | 5275 | 35423 |
| Keyboard | 8505 | 42709 | 3838 | 55055 |
| Mallet | 27722 | 5581 | 1763 | 35066 |
| Organ | 176 | 36401 | 0 | 36577 |
| Reed | 14262 | 76 | 528 | 14866 |
| String | 20510 | 84 | 0 | 20594 |
| Synth Lead | 0 | 0 | 5501 | 5501 |
| Vocal | 3925 | 140 | 6688 | 10753 |
| Total | 102978 | 110224 | 86777 | 306043 |

TABLE 4

Co-occurrence probabilities and marginal frequencies of quality annotations. Both are presented as percentages.

| | Quality | Bright | Dark | Distortion | Fast Decay | Long Release | Multiphonic | Nonlinear Env | Percussive | Reverb | Tempo-Synced |
|---|---|---|---|---|---|---|---|---|---|---|---|
| Co-Occurrence | Dark | 0.0 | | | | | | | | | |
| | Distortion | 25.9 | 2.5 | | | | | | | | |
| | Fast Decay | 10.0 | 7.5 | 8.1 | | | | | | | |
| | Long Release | 9.0 | 5.2 | 9.8 | 0.0 | | | | | | |
| | Multiphonic | 6.0 | 1.5 | 5.4 | 2.8 | 6.9 | | | | | |
| | Nonlinear Env | 8.5 | 1.4 | 6.6 | 2.1 | 6.7 | 8.6 | | | | |
| | Percussive | 6.2 | 5.1 | 3.0 | 52.0 | 0.8 | 2.4 | 0.9 | | | |
| | Reverb | 6.6 | 8.9 | 0.3 | 13.0 | 13.7 | 0.7 | 3.5 | 12.4 | | |
| | Tempo-Synced | 2.4 | 1.8 | 5.2 | 0.4 | 6.4 | 9.3 | 2.3 | 1.5 | 0.0 | |
| | Frequency | 13.5 | 11.0 | 17.0 | 14.7 | 8.5 | 3.4 | 3.2 | 10.2 | 16.8 | 1.8 |

6.3. Details of Example Pitch and Quality Classifier

An example multi-task classification model was trained to do pitch and quality tag classification on the entire NSynth dataset. The encoder structure was used from the baseline model with the exception that there is no bottleneck (see FIG. 10). A softmax-crossentropy loss was used for the pitch labels as they are mutually exclusive and a sigmoid-crossentropy loss for the quality tags as they are not. Note that since the architecture uses only magnitude spectra, it cannot take advantage of the improved phase coherence of the WaveNet samples.

FIG. 9 illustrates an example confusion matrix for linear pitch classification model trained on embeddings from a neural synthesis autoencoder. The predominant error is predicting the wrong octave (being off by 12 tones). Training with pitch conditioning reduces the classifier accuracy.

Figure 10:
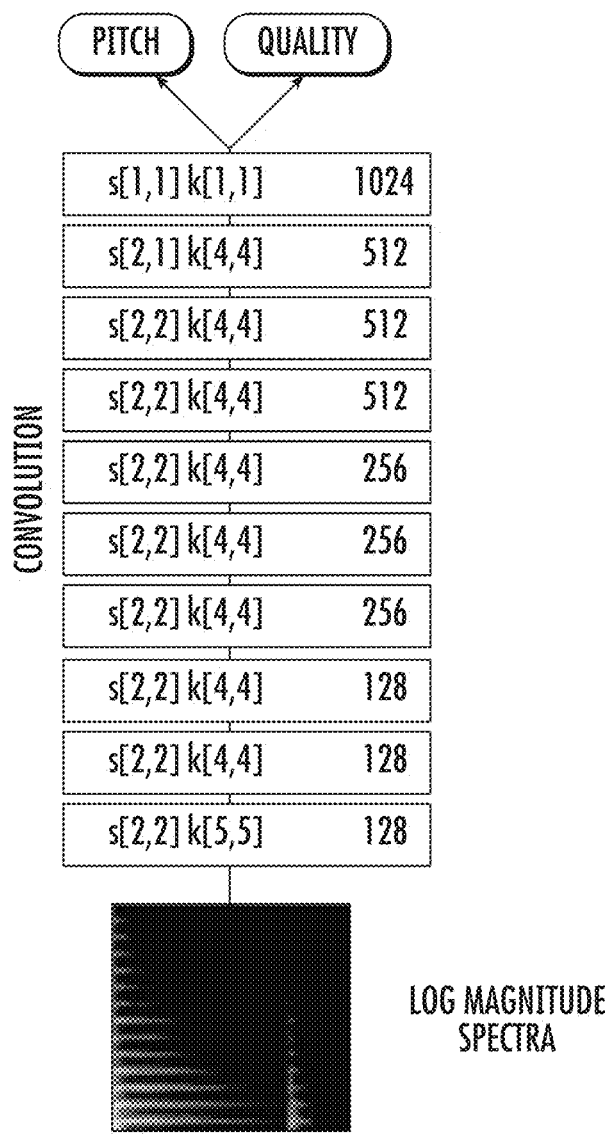
FIG. 10 depicts an example model architecture for an example pitch and quality classifier according to example embodiments of the present disclosure.

FIG. 10 illustrates an example model architecture for pitch and quality classification. Like the baseline encoder, each convolution layer is followed by batch normalization and a Leaky-ReLU (0.1 off-slope).

7. Example Computing Systems

Figure 11:
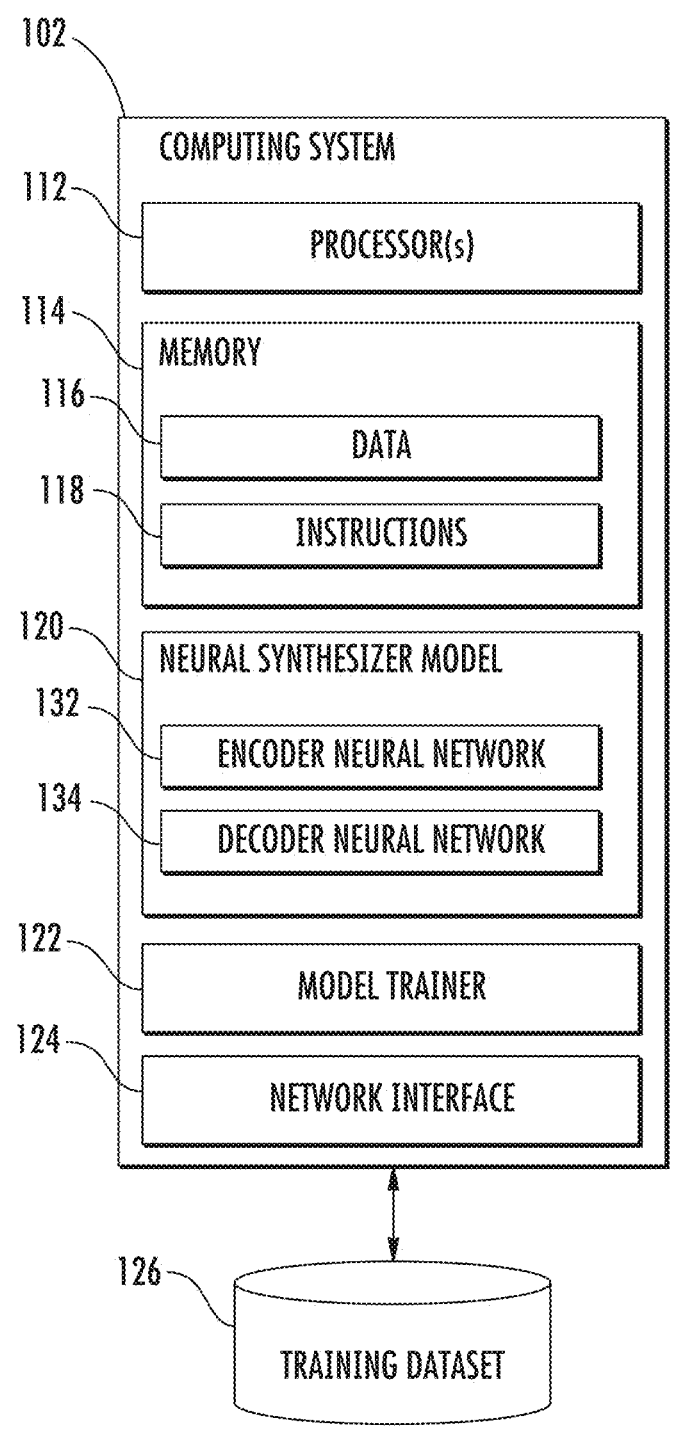
FIG. 11 depicts an example computing system to generate music according to example embodiments of the present disclosure.

FIG. 11 depicts an example computing system 102 that can implement the present disclosure. The computing system 102 can include one or more physical computing devices. The one or more physical computing devices can be any type of computing device, including a server computing device, a personal computer (e.g., desktop or laptop), a mobile computing device (e.g., smartphone or tablet), an embedded computing device, or other forms of computing devices, or combinations thereof. The computing device(s) can operate sequentially or in parallel. In some implementations, the computing device(s) can implement various distributed computing techniques.

The computing system includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor(s) 112 to cause the computing system 102 to perform operations.

The computing system 102 can further include a machine-learned neural synthesis model 120. In some implementations, the machine-learned neural synthesis model 120 can be or include a neural network (e.g., deep neural network). Neural networks can include feed-forward neural networks, recurrent neural networks, convolutional neural networks, and/or other forms of neural networks.

In some implementations, the machine-learned neural synthesis model 120 can include an encoder neural network 132 and/or a decoder neural network 134. As one example, the machine-learned neural synthesis model 120 can be the same as or similar to the neural synthesizer 10 illustrated in FIG. 1A.

The computing system 102 can further include a model trainer 122. The model trainer 122 can train the machine-learned model 120 using various training or learning techniques, such as, for example, backwards propagation of errors. The model trainer 122 can perform a number of generalization techniques (e.g., weight decays, dropouts, etc.) to improve the generalization capability of the models being trained.

In particular, the model trainer 122 can train a machine-learned model 120 based on a set of training data 126. In some implementations, the training dataset 126 can include the NSynth dataset.

The model trainer 122 can include computer logic utilized to provide desired functionality. The model trainer 122 can be implemented in hardware, firmware, and/or software controlling a general purpose processor. For example, in some implementations, the model trainer 122 includes program files stored on a storage device, loaded into a memory and executed by one or more processors. In other implementations, the model trainer 122 includes one or more sets of computer-executable instructions that are stored in a tangible computer-readable storage medium such as RAM hard disk or optical or magnetic media.

The computing system 102 can also include a network interface 124 used to communicate with one or more systems or devices, including systems or devices that are remotely located from the computing system 102. The network interface 124 can include any number of components to provide networked communications (e.g., transceivers, antennas, controllers, cards, etc.).

8. Example Methods

Figure 12:
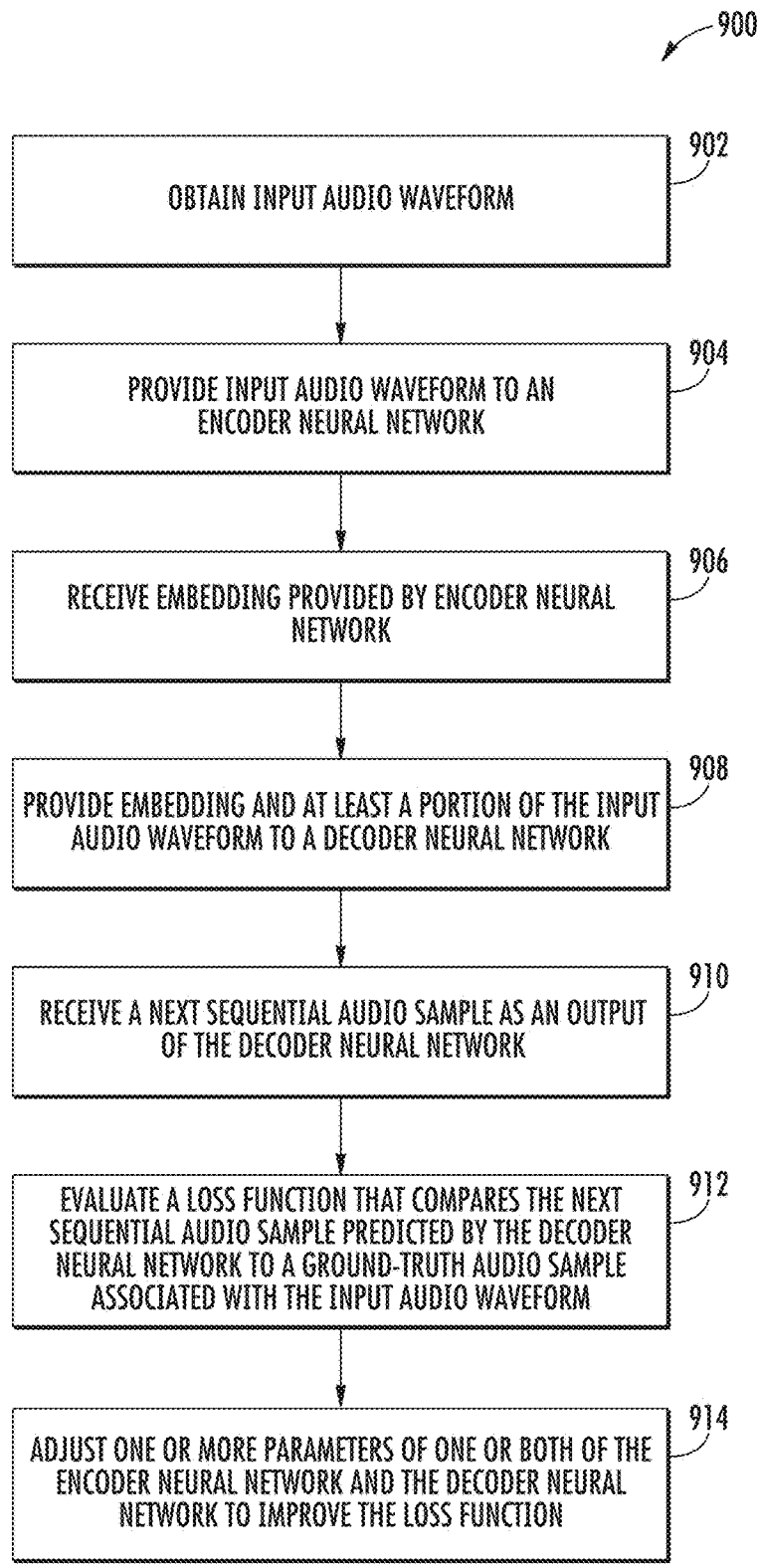
FIG. 12 depicts a flowchart diagram of an example method to generate music according to example embodiments of the present disclosure.

FIG. 12 depicts a flowchart diagram of an example method 900 to generate music according to example embodiments of the present disclosure. In particular, method 900 can be performed to train a neural synthesis autoencoder.

At 902, a computing system obtains an input audio waveform. As one example, the input audio waveform can correspond to audio of a single musical note. As another example, the input audio waveform can correspond to audio of a musical composition (e.g., that is indicative of a musical style or sound).

At 904, the computing system provides the input audio waveform to an encoder neural network. In some implementations, the encoder neural network can include one or more convolutional layers. For example, the convolutional layers can be dilated convolutional layers and/or non-causal convolutional layers.

At 906, the computing system receives an embedding provided by the encoder neural network. For example, the embedding can be descriptive of the input audio waveform such as, for example, musical characteristics (e.g., timbre) of the input audio waveform.

At 908, the computing system provides the embedding and at least a portion of the input audio waveform to a decoder neural network. In some implementations, the decoder neural network is configured to receive the embedding and a causally shifted version of the input audio waveform and, in response, predict a next sequential audio sample for the input audio waveform.

In some implementations, the decoder neural network can be an autoregressive network that predicts the next sequential audio sample based on a plurality of previous audio samples included in the input audio waveform. In some implementations, the decoder neural network can include one or more convolutional layers. For example, the convolutional layers can be dilated convolutional layers and/or causal convolutional layers.

In some implementations, the decoder neural network can be conditioned on the embedding. As a further example, the decoder neural network can be further configured to be conditioned on a pitch embedding.

In some implementations, providing the embedding to the decoder neural network at 908 can include upsampling the embedding to an original resolution of the input audio waveform. Each of one or more layers of the decoder neural network can be biased with a different linear projection of the upsampled embedding.

At 910, the computing system receives the next sequential audio sample as an output of the decoder neural network.

At 912, the computing system evaluates a loss function that compares the next sequential audio sample predicted by the decoder neural network to a ground-truth audio sample associated with the input audio waveform.

At 914, the computing system adjusts one or more parameters of one or both of the encoder neural network and the decoder neural network to improve (e.g., reduce or otherwise optimize) the loss function. For example, the loss function can be backpropagated through the decoder neural network and then continuing through the encoder neural network in an end-to-end fashion.

Figure 13:
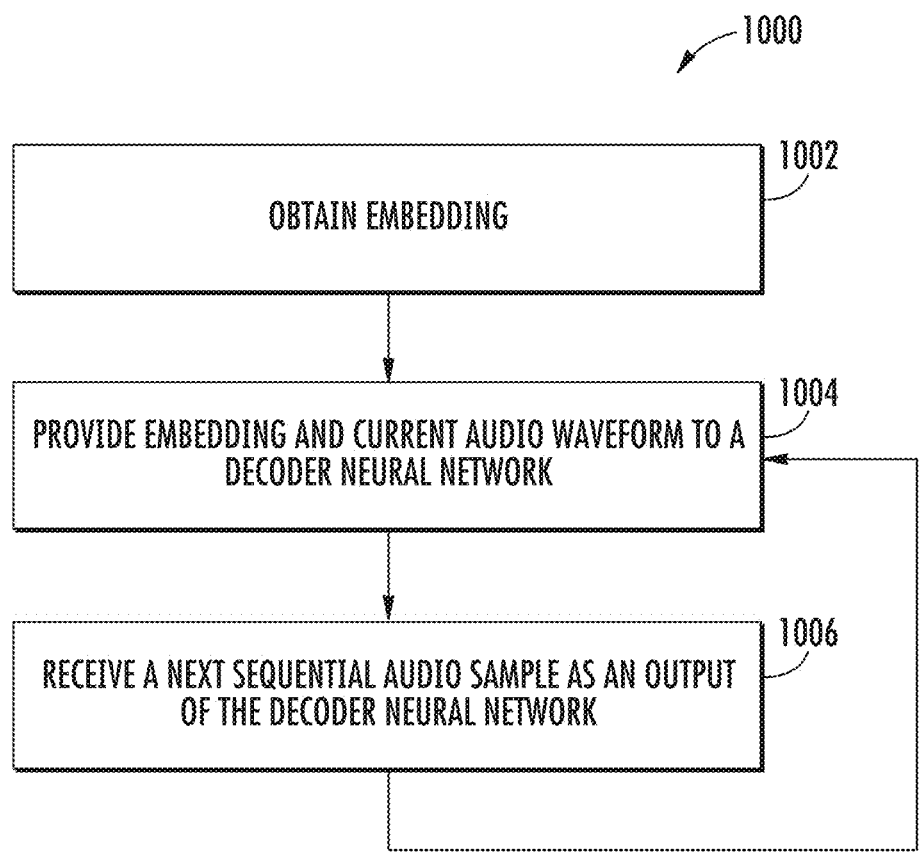
FIG. 13 depicts a flowchart diagram of an example method to generate music according to example embodiments of the present disclosure.

FIG. 13 depicts a flowchart diagram of an example method 1000 to generate music according to example embodiments of the present disclosure.

At 1002, a computing system obtains an embedding. For example, the embedding can be descriptive of one or more desired audio characteristics. For example, the embedding can be descriptive of one or more of a desired timbre and a desired pitch.

In some implementations, obtaining the embedding at 1002 can include inferring the embedding from a second audio waveform. In some implementations, obtaining the embedding at 1002 can include generating the embedding by interpolating two or more second embeddings respectively associated with different musical characteristics (e.g., different musical instruments). For example, the two or more second embeddings can be interpolated according to a multigrid selection.

At 1004, the computing system provides the embedding and a current audio waveform to a decoder neural network. In some implementations, the decoder neural network can be configured to receive the embedding and autoregressively generate a first audio waveform based at least in part on the embedding.

In some implementations, the decoder neural network has been jointly trained as part on an autoencoder model that further includes an encoder neural network configured to receive input audio waveforms and to provide embeddings descriptive of the input audio waveforms.

In some implementations, the decoder neural network can be an autoregressive network that iteratively builds an audio waveform by predicting one audio sample at each of a plurality of iterations. In some implementations, the decoder neural network can include one or more convolutional layers. For example, the convolutional layers can be dilated convolutional layers and/or causal convolutional layers.

At 1006, the computing system receives a next sequential audio sample as an output of the decoder neural network. After 1006, the method 1000 can, in some instances, return to 1004. In such fashion, an audio waveform can be iteratively and autoregressively generated.

9. Example Applications

Figure 14:
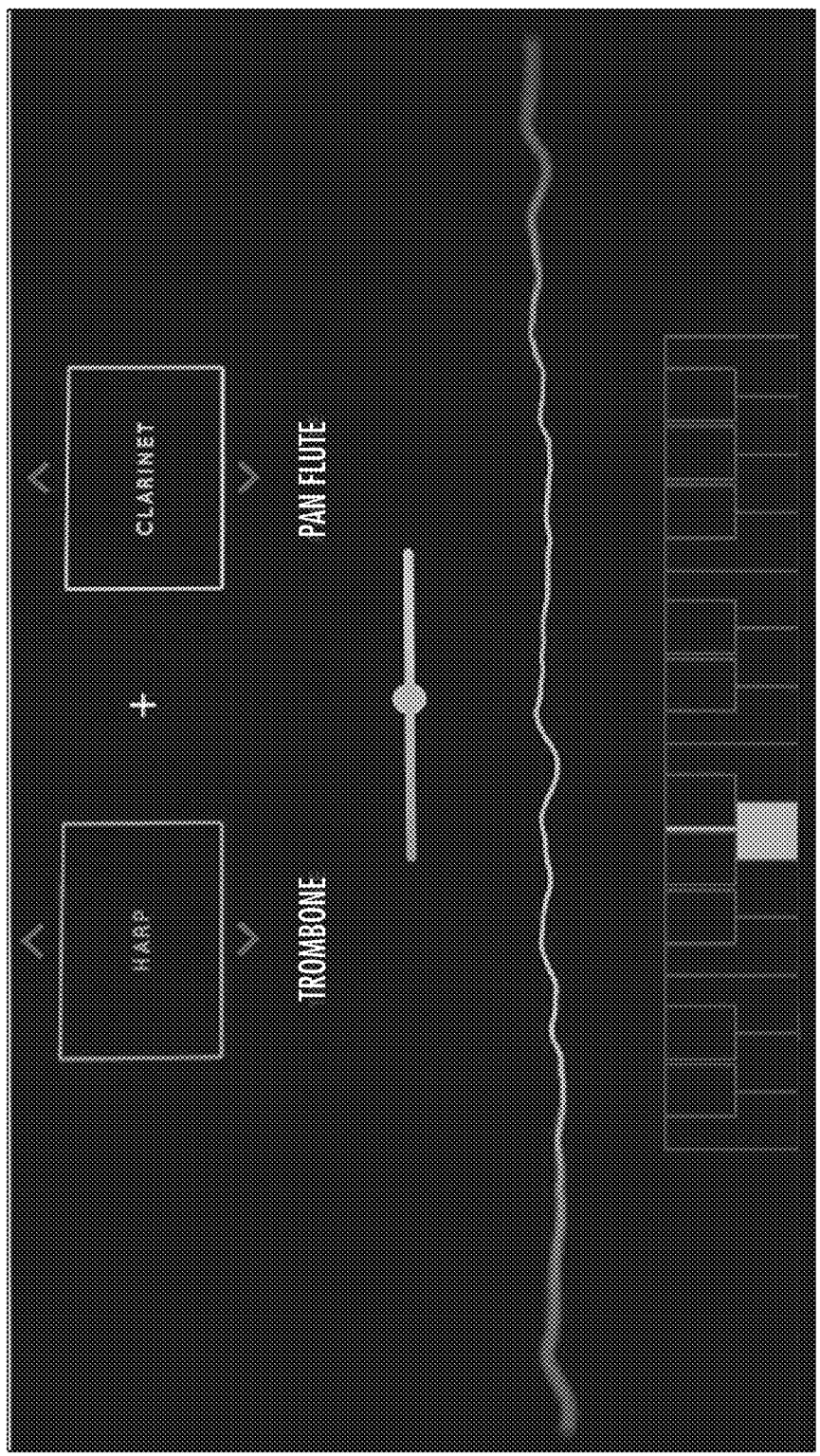
FIG. 14 depicts an example user interface according to example embodiments of the present disclosure.

FIG. 14 depicts an example user interface that allows a user to mix embeddings to generate new audio waveforms according to example embodiments of the present disclosure. The user interface can allow a user to interact with an application, program, or other component (e.g., as a service from a server to a client device via a client-server relationship) that enables the generation of new sounds with machine learning. In particular, the application or other component can let a user interpolate between pairs of instruments, musical characteristics such as timbre, or even non-instrumental sounds such as dogs, thunder, cheering, etc. to create new audio waveforms. In particular, the embeddings for the selected pair of items can be interpolated and then provided to a neural synthesizer (e.g., a decoder network) to generate the new sound. In some implementations, the embeddings can be interpolated according to a weighted interpolation. For example, the weighting of the weighted interpolation can be controlled by the user (e.g., via a slider within the user interface that enables the user to weight the interpolated embedding more towards one of the pair of embeddings to be interpolated).

In other implementations, a user can interpolate between three or more instruments or other musical characteristics. For example, in some implementations, instruments can be positioned at the corners of a square grid, allowing the user to mix among all four. Even further, a significant number of these four instrument grids can be tiled next to each other, creating a "multigrid". This interface can allow the user to explore up to 64 different instruments by dragging across a single x-y pad. At every point, the user is mixing the four nearest instruments. As yet another example, instruments can be arranged around a ring and the user can mix among the instruments by selecting a location within the ring that results in a weighting applied to an interpolation of the instrument embeddings.

In some implementations, because certain implementations of the neural synthesizer can be computationally expensive, rather than generating sounds created by the user on demand, a set of original sounds can be curated ahead of time. In addition, all of the various possible interpolated embedding representations can be synthesized. To smooth out the transitions, the audio can be mixed in real-time from the nearest sound on the grid. In other implementations, the neural synthesizer is run on-demand in response to requests from the user.

In some implementations, the embeddings can be multiplied by a linear coefficient to "turn up the volume." In some implementations, caricatures of sounds can be created by linearly scaling the difference of the sound's embedding from a mean embedding, for example, according to: $z_{new}=z_{mean}+\text{scaling}(z-z_{mean})$, where the scaling coefficient controls the degree to which the sound is transformed into its caricature. In some implementations, noise can be added to the embeddings.

9. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 12 and 13 respectively depict steps performed in a particular order for purposes of illustration and discussion, the methods of the present disclosure are not limited to the particularly illustrated order or arrangement. The various steps of the methods 900 and 1000 can be omitted, rearranged, combined, and/or adapted in various ways without deviating from the scope of the present disclosure.

Although the systems and methods of the present disclosure are discussed with particular reference to generating music, the systems, methods, and techniques of the present disclosure can be used to generate other types of audio waveforms as well, including, for example, human speech audio waveforms.

What is claimed is:

1. A computer system to generate music, the computer system comprising:
   a machine-learned neural synthesizer model comprising an autoencoder model, the autoencoder model comprising an encoder neural network and a decoder neural network;
   wherein the encoder neural network is configured to receive an input audio waveform and, in response, provide an embedding descriptive of the input audio waveform; and
   wherein the decoder neural network is configured to receive the embedding and at least a portion of the input audio waveform and, in response, predict a next sequential audio sample for the input audio waveform;
   one or more processors; and
   one or more non-transitory computer readable media that collectively store instructions that, when executed by the one or more processors cause the computer system to perform operations, the operations comprising:
      evaluating a loss function that compares the next sequential audio sample predicted by the decoder neural network to a ground-truth audio sample associated with the input audio waveform; and
      adjusting one or more parameters of the autoencoder model to improve the loss function.

2. The computer system of claim 1, wherein the input audio waveform corresponds to audio of a single musical note.

3. The computer system of claim 1, wherein the decoder neural network comprises an autoregressive network that predicts the next sequential audio sample based on a plurality of previous audio samples included in the input audio waveform.

4. The computer system of claim 1, wherein:
   the encoder neural network comprises one or more first convolutional layers; and
   the decoder neural network comprises one or more second convolutional layers.

5. The computer system of claim 3, wherein the one or more second convolutional layers of the decoder neural network comprise one or more dilated convolutional layers.

6. The computer system of claim 3, wherein the one or more second convolutional layers of the decoder neural network comprise one or more causal convolutional layers.

7. The computer system of claim 3, wherein the one or more first convolutional layers of the encoder neural network comprise one or more dilated convolutional layers.

8. The computer system of claim 1, wherein the decoder neural network is configured to receive the embedding and a causally shifted version of the input audio waveform and, in response, predict the next sequential audio sample for the input audio waveform.

9. The computer system of claim 1, wherein the encoder neural network comprises a temporal encoder neural network configured to provide a temporal embedding that comprises a sequence of hidden codes with separate dimensions for time and channel.

10. The computer system of claim 1, wherein the decoder neural network is conditioned on the embedding.

11. The computer system of claim 9, wherein the decoder neural network is further configured to be conditioned on a pitch embedding.

12. The computer system of claim 1, wherein the operations further comprise:
   upsampling, by the one or more computing devices, the embedding to an original resolution of the input audio waveform; and
   wherein each of one or more layers of the decoder neural network is biased with a different linear projection of the upsampled embedding.

13. A computer-implemented method to generate music, the method comprising:
   obtaining, by one or more computing devices, a first embedding descriptive of one or more desired audio characteristics;
   inputting, by the one or more computing devices, the first embedding into a decoder neural network configured to receive the first embedding and autoregressively generate a first audio waveform based at least in part on the first embedding, the decoder neural network having been jointly trained as part on an autoencoder model that further comprises an encoder neural network configured to receive input audio waveforms and to provide embeddings descriptive of the input audio waveforms;
   receiving, by the one or more computing devices, the first audio waveform as an output of the decoder neural network.

14. The computer-implemented method of claim 13, wherein the first embedding is descriptive of one or more of a desired timbre and a desired pitch.

15. The computer-implemented method of claim 13, wherein the decoder neural network comprises a strictly autoregressive network that iteratively builds the first audio waveform by predicting one audio sample at each of a plurality of iterations.

16. The computer-implemented method of claim 13, wherein the decoder neural network comprises one or more convolutional layers.

17. The computer-implemented method of claim 16, wherein the one or more convolutional layers of the decoder neural network comprise one or more dilated convolutional layers.

18. The computer-implemented method of claim 16, wherein the one or more convolutional layers of the decoder neural network comprise one or more causal convolutional layers.

19. The computer-implemented method of claim 13, wherein obtaining, by one or more computing devices, the first embedding descriptive of the one or more desired audio characteristics comprises:
   inferring, by the one or more computing devices, the first embedding from a second audio waveform; or generating, by the one or more computing devices, the first embedding by interpolating two or more second embeddings respectively associated with different musical instruments.

20. One or more non-transitory computer-readable media that collectively store:
- a generative neural network configured to receive embeddings and autoregressively generate audio waveforms based at least in part on the embeddings, the generative neural network having been jointly trained as part of an autoencoder model that further comprises an embedding neural network configured to receive example audio waveforms and to provide embeddings descriptive of the example audio waveforms; and
- instructions that, when executed by one or more processors, cause the one or more processors to perform operations, the operations comprising:
  - obtaining, by one or more computing devices, a first embedding descriptive of one or more desired audio characteristics;
  - inputting, by the one or more computing devices, the first embedding into the generative neural network; and
  - receiving, by the one or more computing devices, the first audio waveform as an output of the generative neural network.

* * * * *